United States Patent
Niu et al.

(10) Patent No.: US 7,056,488 B2
(45) Date of Patent: Jun. 6, 2006

(54) CONTROLLED-PORE CATALYST STRUCTURES AND PROCESS FOR PRODUCING SYNTHESIS GAS

(75) Inventors: Tianyan Niu, Ponca City, OK (US); Daxiang Wang, Ponca City, OK (US); David M. Minahan, Stillwater, OK (US); Harold A. Wright, Ponca City, OK (US); Gloria I. Straguzzi, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 417 days.

(21) Appl. No.: 10/299,879

(22) Filed: Nov. 19, 2002

(65) Prior Publication Data
US 2003/0180215 A1    Sep. 25, 2003

Related U.S. Application Data

(60) Provisional application No. 60/364,204, filed on Mar. 13, 2002.

(51) Int. Cl.
*C01B 3/26* (2006.01)
*C01G 1/04* (2006.01)

(52) U.S. Cl. .................. 423/651; 423/416.2
(58) Field of Classification Search ............ 423/418.2, 423/651; 252/373
See application file for complete search history.

(56) References Cited

U.S. PATENT DOCUMENTS

| | | | |
|---|---|---|---|
| 4,766,105 A * | 8/1988 | Lauritzen ................ | 502/216 |
| 5,023,276 A | 6/1991 | Yarrington et al. ........ | 514/703 |
| 5,128,291 A | 7/1992 | Wax et al. ................. | 502/8 |
| 5,149,464 A | 9/1992 | Green et al. ............... | 252/373 |
| 5,500,149 A | 3/1996 | Green et al. ............... | 252/373 |
| 5,510,056 A | 4/1996 | Jacobs et al. .............. | 252/373 |
| 5,639,401 A | 6/1997 | Jacobs et al. .............. | 252/373 |
| 5,648,582 A | 7/1997 | Schmidt et al. ............ | 585/652 |
| 5,827,421 A | 10/1998 | Sherwood, Jr. ............ | 208/112 |
| 5,962,367 A | 10/1999 | Shen et al. ................. | 502/439 |
| 6,072,097 A | 6/2000 | Yokoyama et al. ........ | 585/658 |
| 6,110,862 A | 8/2000 | Chen et al. ................ | 502/326 |
| 6,329,434 B1 | 12/2001 | Wen et al. .................. | 518/703 |
| 2001/0027258 A1 | 10/2001 | Hohn et al. ................ | 568/955 |
| 2003/0096880 A1* | 5/2003 | Wang et al. ................ | 518/714 |

FOREIGN PATENT DOCUMENTS

| | | |
|---|---|---|
| EP | 0303438 A2 | 8/1988 |
| EP | 0333037 A2 | 3/1989 |
| EP | 0576096 A2 | 6/1993 |
| EP | 0640561 A1 | 8/1994 |
| EP | 0974551 A1 | 4/1998 |
| WO | WO 96/16737 | 6/1996 |
| WO | WO 99/35082 | 7/1999 |
| WO | WO 99/48805 | 9/1999 |
| WO | WO 02/20395 | 3/2002 |

OTHER PUBLICATIONS

A. Cybulski and J.A. Moulijn (Eds.), *Structured Catalysts and Reactors*, Marcel Dekker, Inc., 1998, p. 599-615 (Ch. 21, X. Xu and J.A. Moulijn, *Transformation of a Structured Carrier into Structured Catalyst*).

Hohn and Schmidt, *Partial oxidation of methane to syngas at high space velocities over Rh-coated spheres*. Applied Catalysis A: General 211:53-68 (2001).

C.J. Geankoplis, *Transport Processes and Unit Operations*, Tyler Standard Screen Scale, Allyn and Bacon, Inc., Boston, MA, p. 837.

PCT/US03/37029 International Search Report dated Apr. 23, 2003.

* cited by examiner

*Primary Examiner*—Colleen P. Cooke
(74) *Attorney, Agent, or Firm*—Conley Rose P.C.

(57) ABSTRACT

Controlled pore structure catalysts are disclosed that are active for catalyzing the partial oxidation of methane to CO and $H_2$ and, advantageously, are capable of initiating the reaction without the need for an additional ignition source. A preferred catalyst comprises rhodium and samarium supported on an alumina or modified alumina support having certain surface area, pore volume, pore size and metal dispersion characteristics that permit light-off of the reaction at temperatures below 500° C. and with little or no use of an ignition agent. A method of partially oxidizing a light hydrocarbon to form synthesis gas, and a method of enhancing low-temperature light-off of the process are also described.

47 Claims, 19 Drawing Sheets

CONTROLLED-PORE CATALYST STRUCTURES AND PROCESS FOR PRODUCING SYNTHESIS GAS

CROSS REFERENCE TO RELATED APPLICATIONS

This application claims the benefit under 35 U.S.C. § 119(e) of U.S. Provisional Patent Application No. 60/364,204 filed Mar. 13, 2002, the disclosure of which is hereby incorporated herein by reference.

BACKGROUND OF THE INVENTION

1. Field of the Invention

The present invention generally relates to the production of synthesis gas. More particularly, the invention relates to supported catalysts and processes for the catalytic partial oxidation of light hydrocarbons (e.g., methane or natural gas) to produce a mixture of primarily carbon monoxide and hydrogen (synthesis gas). The invention also relates to methods of preparing a catalyst or catalyst support material having properties that provide low-temperature light-off of the direct catalytic partial oxidation reaction and enhance the production of synthesis gas.

2. Description of Related Art

Large quantities of methane, the main component of natural gas, are available in many areas of the world, and natural gas is predicted to outlast oil reserves by a significant margin. However, most natural gas is situated in areas that are geographically remote from population and industrial centers. The costs of compression, transportation, and storage make its use economically unattractive.

To improve the economics of natural gas use, much research has focused on methane as a starting material for the production of higher hydrocarbons and hydrocarbon liquids. The conversion of methane to hydrocarbons is typically carried out in two steps. In the first step, methane is reformed with water to produce carbon monoxide and hydrogen (i.e., synthesis gas or syngas). In a second step, the syngas intermediate is converted to higher hydrocarbon products by processes such as the Fischer-Tropsch Synthesis. For example, fuels with boiling points in the middle distillate range, such as kerosene and diesel fuel, and hydrocarbon waxes may be produced from the synthesis gas.

Current industrial use of methane as a chemical feedstock proceeds by the initial conversion of methane to carbon monoxide and hydrogen by either steam reforming or dry reforming. Steam reforming currently is the major process used commercially for the conversion of methane to synthesis gas, the reaction proceeding according to Equation 1.

$$CH_4 + H_2O \leftrightarrows CO + 3H_2 \tag{1}$$

Although steam reforming has been practiced for over five decades, efforts to improve the energy efficiency and reduce the capital investment required for this technology continue. The steam reforming reaction is endothermic (about 49 kcal/mol), requiring the expenditure of large amounts of fuel to produce the necessary beat for the industrial scale process. Another drawback of steam reforming is that for many industrial applications, the 3:1 ratio of $H_2$:CO products is problematic, and the typically large steam reforming plants are not practical to set up at remote sites of natural gas formations.

The catalytic partial oxidation ("CPOX") of hydrocarbons, e.g., methane or natural gas, to syngas has also been described in the literature. In catalytic partial oxidation, natural gas is mixed with air, oxygen-enriched air, or oxygen, and introduced to a catalyst at elevated temperature and pressure. The partial or direct oxidation of methane yields a syngas mixture with a H2:CO ratio of 2:1, as shown in Equation 2.

$$CH_4 + \tfrac{1}{2} O_2 \rightarrow CO + 2H_2 \tag{2}$$

This ratio is more useful than the $H_2$:CO ratio from steam reforming for the downstream conversion of the syngas to chemicals such as methanol or to fuels. The CPOX reaction is exothermic (−8.5 kcal/mol), in contrast to the strongly endothermic steam reforming reaction. Furthermore, oxidation reactions are typically much faster than reforming reactions. This allows the use of much smaller reactors for catalytic partial oxidation processes than is possible in a conventional steam reforming process.

While its use is currently limited as an industrial process, CPOX of methane has recently attracted much attention due to its inherent advantages, such as the fact that due to the significant heat that is released during the process, there is no requirement for the continuous input of heat in order to maintain the reaction, in contrast to steam reforming processes. An attempt to overcome some of the disadvantages and costs typical of steam reforming by production of synthesis gas via the catalytic partial oxidation of methane is described in European Patent No. 303,438. According to that method, certain high surface area monoliths coated with metals or metal oxides that are active as oxidation catalysts, e.g., Pd, Pt, Rh, Ir, Os, Ru, Ni, Cr, Co, Ce, La, and mixtures thereof, are employed as catalysts. Other suggested coating metals are noble metals and metals of groups IA, IIA, III, IV, VB, VIB, or VIIB of the periodic table of the elements.

Other methane oxidation reactions include the highly exothermic combustion (−192 kcaL/mol) and partial combustion (−124 kcal/mol) reactions, Equations 3 and 4, respectively.

$$CH_4 + 2\ O_2 \rightarrow CO_2 + 2H_2O \tag{3}$$

$$CH_4 + 3/2\ O_2 \rightarrow CO + 2H_2O \tag{4}$$

U.S. Pat. No. 5,149,464 describes a method for selectively converting methane to syngas at 650–950° C. by contacting a methane/oxygen mixture with a solid catalyst which is a d-block transition metal on a refractory support, an oxide of a d-block transition metal, or a compound of the formula $M_xM'_yO_z$ wherein M' is a d-block transition metal and M is Mg, B, Al, Ga, Si, Ti, Zr, Hf or a lanthanide.

U.S. Pat. No. 5,500,149 describes the combination of dry reforming and partial oxidation of methane, in the presence of added $CO_2$ to enhance the selectivity and degree of conversion to synthesis gas. The catalyst is a d-block transition metal or oxide such as a group VIII metal on a metal oxide support such as alumina, is made by precipitating the metal oxides, or precursors thereof such as carbonates or nitrates or any thermally decomposable salts, onto a refractory solid which may itself be massive or particulate; or one metal oxide or precursor may be precipitated onto the other. Preferred catalyst precursors are those having the catalytic metal highly dispersed-on an inert metal oxide support and in a form readily reducible to the elemental state.

For successful commercial scale operation a catalytic partial oxidation process must be able to achieve and sustain a high conversion of the methane feedstock at high gas hourly space velocities, with high selectivity for the desired $H_2$ and CO products. Moreover, such high conversion and selectivity levels must be achieved without detrimental effects to the catalyst, such as the formation of carbon deposits ("coke") on the catalyst, which severely reduces catalyst performance. The choice of catalyst composition and the manner in which the catalyst is made are important factors in determining whether a catalyst will have sufficient physical and chemical stability to operate satisfactorily for extended periods of time on stream at moderate to high temperatures and will avoid high pressure drop in a syngas production operation.

In most of the existing syngas production processes it is difficult to select a catalyst that will be economical for large scale industrial use, yet will provide the desired level of activity and selectivity for CO and $H_2$ and demonstrate long on-stream life. Today, metal oxide supported noble metal catalysts or mixed metal oxide catalysts are most commonly used for the selective oxidation of hydrocarbons and for catalytic combustion processes. Various techniques are employed to prepare the catalysts, including impregnation, washcoating, xerogel, aerogel or sol gel formation, spray drying and spray roasting. Monolith supported catalysts having pores or longitudinal channels or passageways are commonly used. Such catalyst forming techniques and configurations are well described in the literature, for example, in *Structured Catalysts and Reactors*, A. Cybulski and J. A. Moulijn (Eds.), Marcel Dekker, Inc., 1998, p. 599–615 (Ch. 21, X. Xu and J. A. Moulijn, "Transformation of a Structured Carrier into Structured Catalyst").

U.S. Pat. No. 5,510,056 discloses a ceramic foam supported Ru, Rh, Pd, Os, Ir or Pt catalyst having a specified tortuosity and number of interstitial pores that is said to allow operation at high gas space velocity. The catalyst is prepared by depositing the metal on a carrier using an impregnation technique, which typically comprises contacting the carrier material with a solution of a compound of the catalytically active metal, followed by drying and calcining the resulting material. The catalyst is employed for the catalytic partial oxidation of a hydrocarbon feedstock.

U.S. Pat. No. 5,648,582 discloses a rhodium or platinum catalyst prepared by washcoating an alumina foam monolith having an open, cellular, sponge-like structure. The catalyst is used for the catalytic partial oxidation of methane at space velocities of 120,000 $h^{-1}$ to 12,000,000 $h^{-1}$ More recently, particulate syngas catalysts have been found to offer certain advantages over monolithic catalysts. For example, Hohn and Schmidt (*Applied Catalysis A: General* 211:53–68 (2001)) compare monolith and particulate (i.e., sphere) beds in a catalytic partial oxidation process, and shows that a non-porous alumina support gave superior results for the production of synthesis gas, even at space velocities of $1.8 \times 10^6$ $h^{-1}$, compared to a comparable alumina monolith support. The internal surface area of the support material is apparently unimportant, as the pre-sintered and unsintered alumina spheres (surface area about 10 $m^2/g$ and about 200 $m^2/g$, respectively) gave the same results after loading with the same amount of Rh. A major advantage of those particle beds is said to be better heat transfer than the corresponding monolithic catalyst.

U.S. Patent Application No. 2001/0027258 A1 describes a catalytic partial oxidation process that includes contacting a $C_1$–$C_4$ hydrocarbon and oxygen with a bed of particulate, supported Group VIII metal catalyst. The support has a surface to volume ratio of about 15–230 $cm^{-1}$ and the preferred catalyst particle size range is about 200–2000 microns in diameter. The preferred support particles generally have a low total surface area, e.g., <20 $m^2/gm$, and microporosity is not important to the process.

PCT Publication No. WO 02/20395 (Conoco Inc.) describes certain rhodium-based catalysts that are active for catalyzing the net partial oxidation of methane to CO and $H_2$. A preferred catalyst comprises highly dispersed, high surface area rhodium on a granular zirconia support with an intermediate coating of a lanthanide and/or lanthanide oxide. The catalyst is thermally conditioned during its preparation.

In order to initiate a CPOX process, it is typically necessary to preheat the catalyst to a temperature at which ignition (i.e., initiation of the CPOX reaction) occurs. This can be problematic, however, because CPOX syngas reactors are small, and providing for an additional ignition source for catalyst heating can complicate the process and significantly add to the size and cost of the syngas reactor system. For example, U.S. Pat. No. 6,329,434 describes an alternative to conventional light-off procedures and equipment. It is pointed out that conventional methods, such as use of a preheating torch or burner, are not practical for catalytic partial oxidation processes, and that too rapid heating of the catalyst bed can destroy the catalyst due to thermal stresses. An $O_2$ and $H_2$ feed, with a diluent, is employed to ignite the catalyst bed and control heat up. Suggested diluents include nitrogen, helium, argon, steam, methane, CO, $CO_2$, ethane, propane, butane, alcohols and olefins.

A technique in common use today for initiating CPOX processes is pre-heating the hydrocarbon feed up to 500° C., or more, before contacting the catalyst. A drawback of pre-heating the hydrocarbon is the increased hazard it presents when hot hydrocarbon is combined with an $O_2$-containing stream. There is also a risk of hydrocracking during preheating of the hydrocarbon feed. Moreover, including a preheat facility increases the capital cost of the syngas production unit. In some CPOX processes, the hydrocarbon feed is briefly spiked or supplemented with an "ignition agent," which is typically a partially oxidizable gas that is more readily oxidizable than methane, natural gas or a mixture of $C_1$–$C_5$ gases at a given temperature. For example, up to about 50 vol % propane in the hydrocarbon feed might be needed in order to initiate the CPOX reaction, keeping the pre-heat temperature below 500° C. PCT Publication No. WO 99/35082 describes starting a CPOX reactor from ambient temperature by using a mixture of light hydrocarbons or ammonia and air preheated at 200° C., and then introducing the gaseous mixture to the catalyst at an appropriate temperature at which combustion will occur.

Use of a supplemental ignition agent such as propane complicates the syngas production procedure, and the associated refrigeration equipment adds to the cost of the system. There are additional safety considerations, and detrimental effects on the efficiency of the syngas production process are possible due to coke deposition. Although significant advances have been made in the development of catalysts and processes for producing synthesis gas, in order for catalytic partial oxidation processes to be commercially feasible there continues to be a need for more efficient and economical processes and catalysts. At the present time, there is no commercially practical CPOX reaction system for the manufacture of syngas. The syngas production process needs to be easier to practice, not dependent upon additional ignition sources, and capable of lighting off at low temperatures. Ideal syngas catalysts would also be physically and chemically stable on stream, resist coking, and also retain a high level of conversion activity and selectivity to carbon monoxide and hydrogen under the conditions of high gas space velocity and elevated pressure that are needed for achieving high space time syngas yield.

SUMMARY OF PREFERRED EMBODIMENTS

In accordance with certain embodiments of the present invention, supported catalysts are provided that possess a specific set of physical parameters ("defined pore structure catalysts") which aid in igniting or achieving light-off or ignition of the CPOX reaction at lower temperatures than otherwise possible with catalysts containing similar elemental or chemical components but having different chemical and/or physical properties. In addition to having a defined pore diameter, the catalyst support material also has defined BET surface area, defined pore volume and metal surface area properties. In preferred embodiments, the initial surface area of the catalyst support is >1 m²/g catalyst, the initial pore volume is >0.01 cc/g catalyst, more preferably in the range of about 0.01–0.6 cc/g catalyst. In preferred embodiments the average pore diameter is in the range of about 10–150 nm, with at least 5% of the pores <10 nm diameter. Preferably at least 5% of the pores have diameters in the range of 0.5–10 nm diameter, up to 95% of the pores are in the 10–250 nm diameter range, and the average pore diameter is in the range of 10–150 nm (as measured using the $N_2$ desorption technique described hereinbelow). In preferred embodiments the initial metal surface area of the catalytic component is greater than 1 $m^2$/g catalyst. In some embodiments, the catalyst used in the syngas production method comprises a packed bed of about 0.5–3 mm diameter spheres. In accordance with certain embodiments of the invention, the catalytic component comprises at least one metal chosen from Rh, Pt, Ir, Ru, Ni, and Pd, and combinations thereof. In some embodiments the catalytic component comprises a promoter chosen from Mg, Ca, Ba, Sr, Li, Na and K. In some embodiments the catalytic component comprises a metal alloy containing at least two metals chosen from Rh, Pt, Ir, Ru, Pd, Co, Fe, Ni, Cu and Zn. In certain preferred embodiments the catalytic component comprises an amount of Rh in the range of about 0.5–10 wt % and an amount of Sm in the range of about 0.5–10 wt % (wt % based on total weight of the supported catalyst).

Together with a suitable catalytic component, all of the above-identified physical parameters combine to provide a particulate, supported catalyst that enhances and simplifies the light-off procedure for the syngas production process As used herein, "light-off procedure" refers to the steps that are taken to start or initiate ("light-off") the catalytic partial oxidation of a light hydrocarbon to produce synthesis gas. Light-off is also sometimes called "catalyst ignition" by those practicing in the field of catalytic synthesis gas production. The light-off procedure and catalyst ignition together result in the reactor exit temperature being at least 50° C. higher than the inlet temperature. Simplification of light-off includes eliminating the need for an additional ignition source or ignition agent, such as introduction of supplemental propane in the hydrocarbon feed. Simplification also includes obtaining start up of the CPOX reaction at a lower temperature than is usually possible, especially for those stabilized supports that are otherwise generally difficult to light off (e.g., modified alumina). In certain embodiments, initiation of syngas production occurs at a temperature under 500° C., preferably 300° C. or less.

After initiation of the CPOX process with the above-described catalyst, the mesoporous/macroporous nature of the catalyst support structure allows continuation of the CPOX reaction and favors the desired high velocity flow rate (gas hourly space velocity) and low pressure drop in a CPOX reactor to make possible high space time yield of syngas. These controlled- or defined-pore structure catalysts also provide high efficiency conversion of $CH_4$ and selectivity for CO and $H_2$ products.

Also provided in accordance with the present invention is a method of aiding or enhancing light-off of a catalytic partial oxidation process for converting a light hydrocarbon and $O_2$ to synthesis gas, preferably at a temperature below about 500° C. and in the absence of a supplemental ignition agent. The term "supplemental ignition agent" refers to any gaseous hydrocarbon or other chemical that, when combined with the reactant gas mixture or exposed to the catalyst in the CPOX reactor, has the effect of initiating the CPOX reaction or facilitating commencement of the reaction at a temperature that is lower than would otherwise be required to start the desired reaction. The initiating effect can result from the partial oxidation of the agent or can result from another chemical reaction that is exothermic enough to heat the catalyst sufficiently to commence the catalytic partial oxidation of the light hydrocarbon feed mixture. A supplemental ignition agent could also be an external heat source such as a heating collar surrounding all or a portion of the catalyst zone of the reactor. This new light-off method comprises contacting a reactant gas mixture containing the light hydrocarbon and $O_2$ with a particulate catalyst comprising a catalytic component and a porous support having a defined pore structure. The support has an initial BET surface area larger than 1 $m^2$/g, pore volume larger than 0.003 cc/g, and average pore size in the range of 10 to 150 nm, in diameter, with at least 5% of the pores being <10 nm in diameter. Preferably the metal surface area of the catalytic component is greater than 1.0 $m^2$/g catalyst, more preferably in the range of about 2–10 $m^2$/g catalyst.

In preferred embodiments, the supported catalyst contains Rh and Sm deposited on an alumina or MgO modified alumina support. The support and/or the supported catalyst preferably possess the following characteristics: (a) BET surface area in the range of about 4–10 $m^2$/g, (b) BJH desorption surface area (surface area of 1.7–300 nm diameter pores) in the range of about 4-10 $m^2$/g, (c) BJH desorption pore volume (of pores having diameters in the range of 1.7–300 nm) in the range of about 0.01–0.1 cc/g, and (d) BJH desorption average pore diameter (4V/A) in the range of about 10–150 nm.

In accordance with another embodiment of the present invention, a method of partially oxidizing a reactant gas mixture comprising a light hydrocarbon and oxygen to form synthesis gas is provided. The method includes initiating a catalytic partial oxidation reaction at a temperature less than 500° C., as described above, more preferably 300° C. or less. The method also includes maintaining catalytic partial oxidation reaction promoting conditions such that a product stream containing CO and $H_2$ is produced. Preferably, initiation of the CPOX reaction is conducted in the absence of a supplemental ignition agent, as described above. In certain embodiments, the syngas production method includes maintaining the catalyst and the reactant gas mixture at conversion promoting conditions (e.g., favorable temperatures, reactant gas composition, pressure, space velocity and contact time) during contacting of the reactant gas mixture with the catalyst. Certain embodiments of the method for partially oxidizing hydrocarbons comprise preheating the reactant gas mixture, preferably in the range of 30° C.–750° C. Some embodiments of the method comprise passing the reactant gas mixture over the catalyst at a gas hourly space velocity (GHSV) of about 20,000–100,000,000 $h^{-1}$, preferably at a GHSV in the range of 100,000–25,000,000 $h^{-1}$. In preferred embodiments the reactant gas mixture/catalyst contact time is no more than about 200 milliseconds, preferably 20–50 milliseconds or less, and more preferably ≦10 milliseconds. In some embodiments the process includes maintaining the catalyst at a temperature of about 400° C.–1,200° C. during contact with the gas mixture. In some embodiments of the process the reactant gas mixture and the catalyst are maintained at superatmospheric pressure during the contacting, and in some of the more preferred embodiments the pressure is in the range of 200–32,000 kPa.

Certain embodiments of the syngas production method comprise mixing a methane-containing feedstock and an oxygen-containing feedstock to provide a reactant gas mixture feedstock having a carbon:oxygen ratio of about 1.5:1 to about 3.3:1, preferably 1.7:1 to 2.1:1, more preferably 2:1.

In some embodiments the said oxygen-containing gas that is mixed with the hydrocarbon comprises steam or $CO_2$, or a mixture of both. In some embodiments the $C_1$–$C_5$ hydrocarbon comprises at least about 80% methane by volume. These and other embodiments, features and advantages of the present invention will become apparent with reference to the following description and drawing.

DETAILED DESCRIPTION OF PREFERRED EMBODIMENTS

In studies leading up to the present invention, in which pre-sintered and unsintered catalyst supports were evaluated, it was determined that the internal surfaces (i.e., the microporous and/or mesoporous surfaces) of supported syngas catalysts do not contribute significantly to the overall catalytic performance in the catalytic partial oxidation of light hydrocarbon to synthesis gas. Therefore, it was unexpected that the new catalysts described herein, having controlled or defined pore structure properties that include certain mesoporous characteristics, specifically improve or enhance light-off of the syngas production process. These catalysts also demonstrate good activity for producing synthesis gas and selectivity for CO and $H_2$ products for an extended period of time on stream. Preferred catalyst components include supported noble metals, such as Rh, Pt, Ir, Ru and Pd, and mixtures thereof. More preferably, the catalyst also contains one or more rare earth element (i.e., La, Ce, Pr, Nd, Pm, Sm, Eu, Gd, Tb, Dy, Ho, Er, Tm, Yb, Lu, Sc, Y or Th) or base metal promoter (e.g., Mg, Ca, Ba, Sr, Li, Na or K).

A Sm promoter is highly preferred, followed by the other lanthanides (i.e., La, Ce, Pr, Nd, Pm, Eu, Gd, Tb, Py, Ho, Er, Tm and Yb), especially Yb or Pr. Other preferred catalysts contain supported metal alloys containing at least two of Rh, Pt, Ir, Ru and Pd and base transition metals such as one or more of Co, Fe, Ni, Cu and Zn, preferably Co and/or Ni. Suitable support materials include refractory materials such as zirconia, magnesium stabilized zirconia, zirconia stabilized alumina, yttrium stabilized zirconia, calcium stabilized zirconia, alumina, magnesium stabilized alumina, cordierite, titania, silica, magnesia, niobia, ceria, vanadia and silicon carbide. By employing those preferred chemical components, and by controlling the catalyst support pore size distribution and surface area of the catalyst support, superior performance for the purposes of achieving low temperature light-off and catalyst stability are achieved. These defined or controlled pore catalysts also maximize use of the catalytic metal by means of high metal surface area and high metal dispersion. The preferred catalyst compositions not only enhance low temperature light-off without use of a supplementary ignition agent, they also perform well for catalyzing the partial oxidation of a light hydrocarbon feed at high conversion rates to syngas, with high selectivity for CO and $H_2$ products. Representative controlled or defined pore structure catalysts and comparative compositions were prepared as follows:

Catalysts Preparation

EXAMPLE 1

Figure 1B:
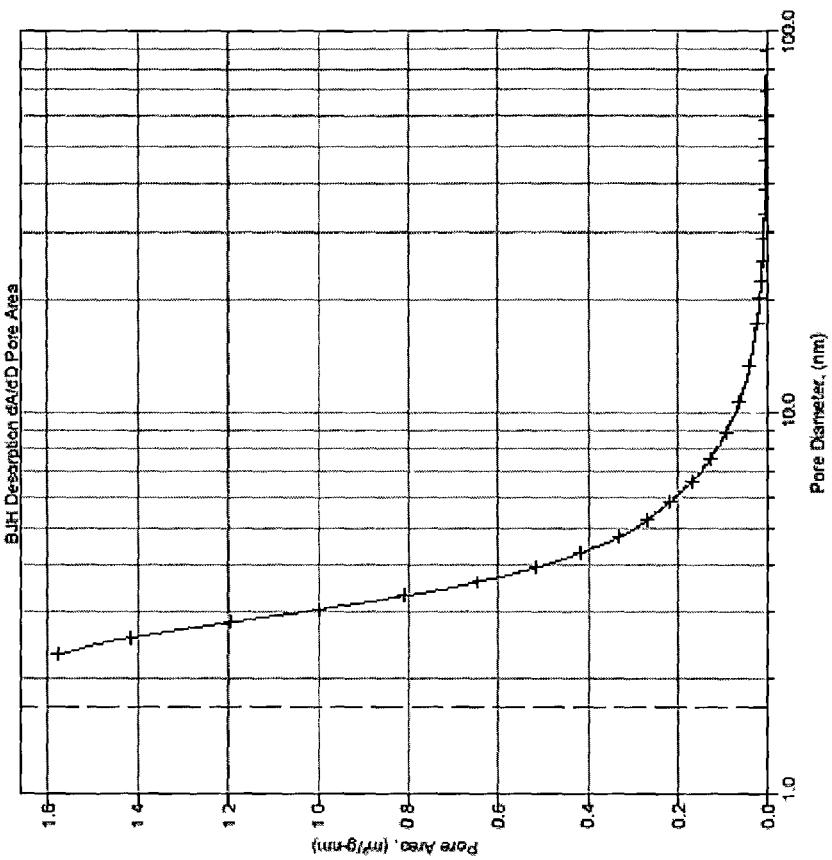
FIG. 1B is a graph showing the pore surface area over the pore diameter range of the same support as in FIG. 1A.
Figure 1A:
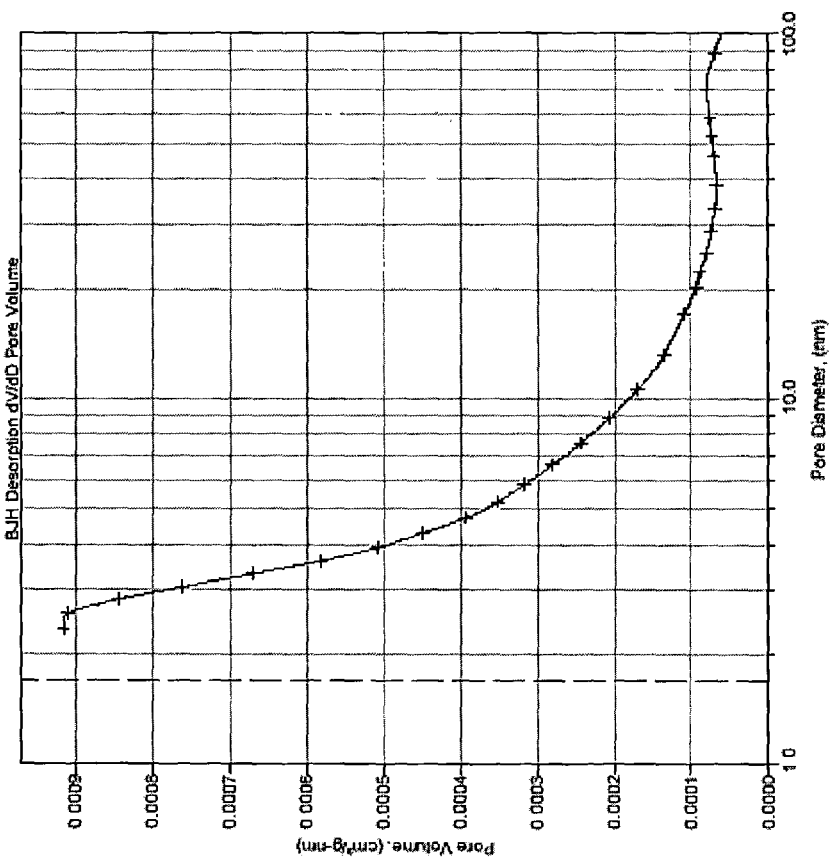
FIG. 1A is a graph showing the pore volume over the pore diameter range of the alumina support used to make the Rh—Sm/$Al_2O_3$ composition of Catalyst No. 1.
Figure 2B:
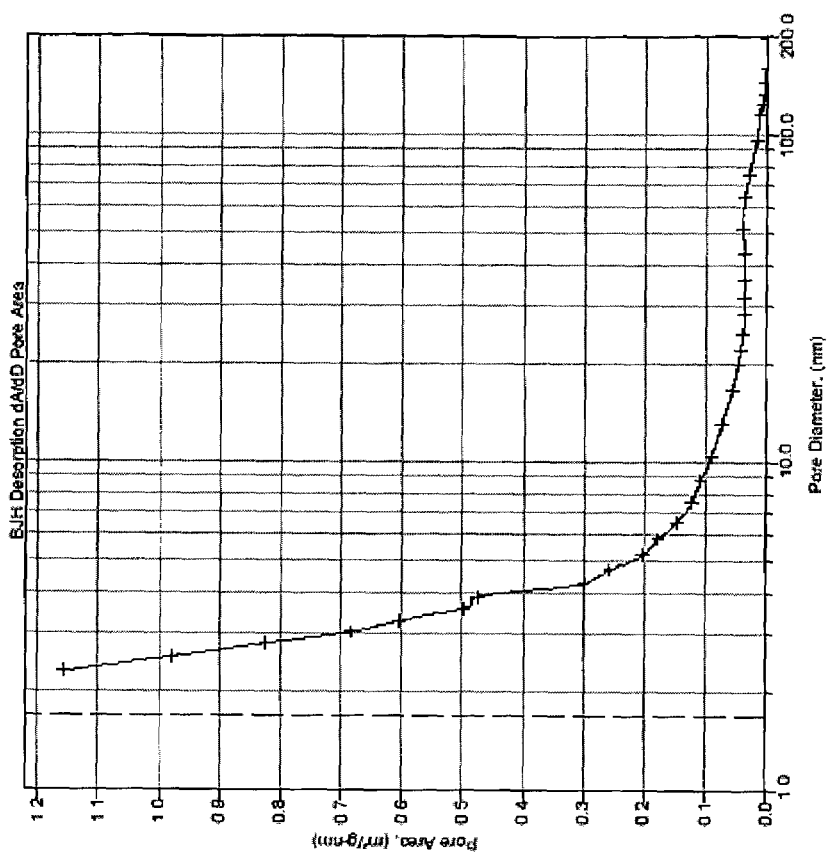
FIG. 2B is a graph showing the pore surface area over the pore diameter range of the same catalyst as in FIG. 2A.
Figure 2A:
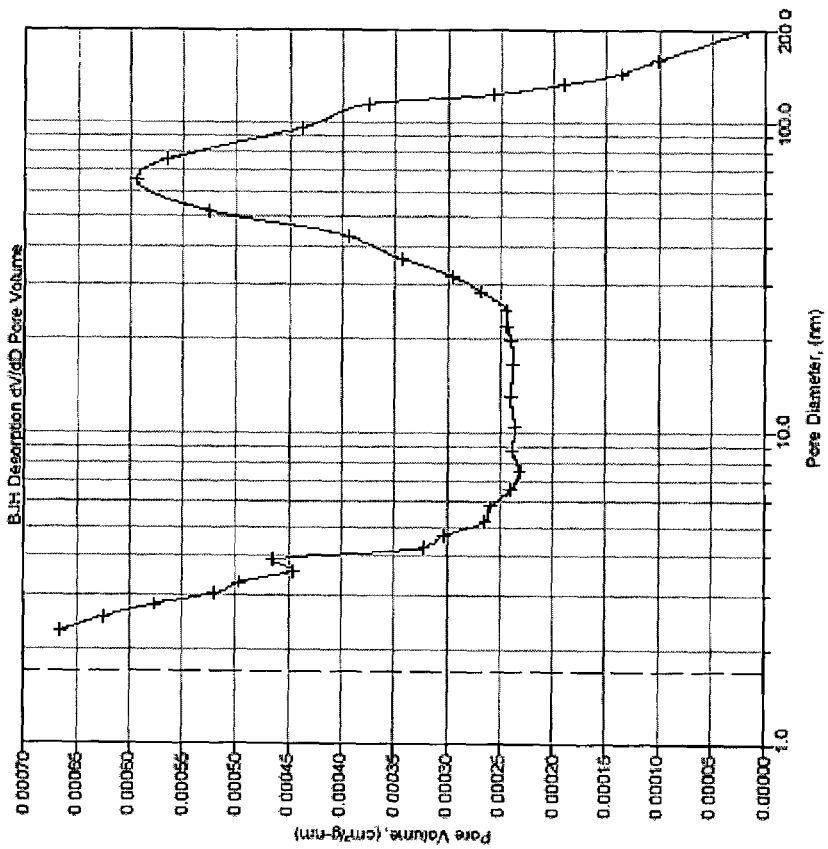
FIG. 2A is a graph showing the pore volume over the pore diameter range of the Rh—Sm impregnated alumina support of FIGS. 1A–B (Catalyst No. 1).
Figure 24:
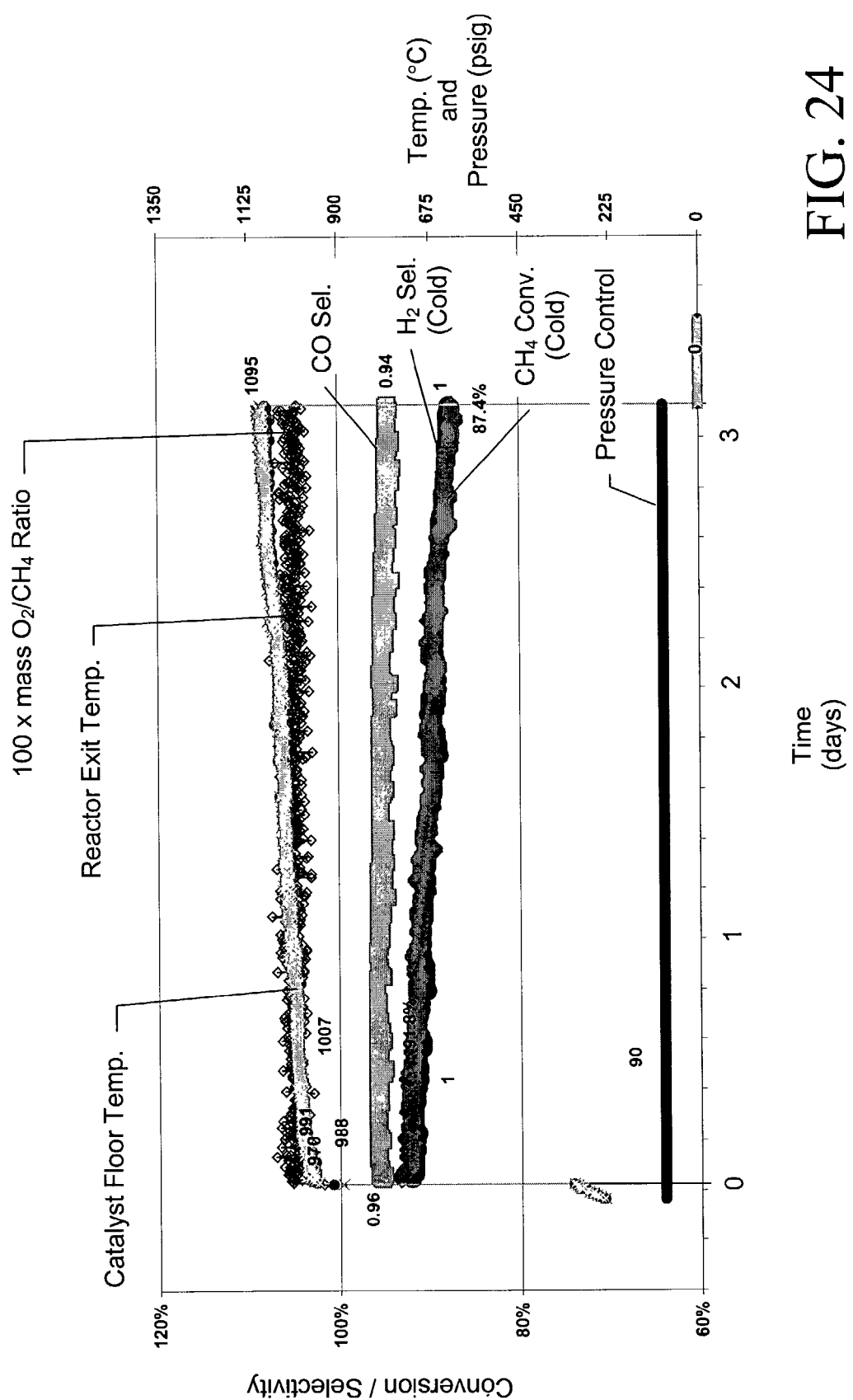
FIG. 24 is a graph showing catalyst performance of the catalyst of FIGS. 2A–B (Catalyst No. 1) for syngas production over a three day period, according to an embodiment of the present invention.
Figure 25:
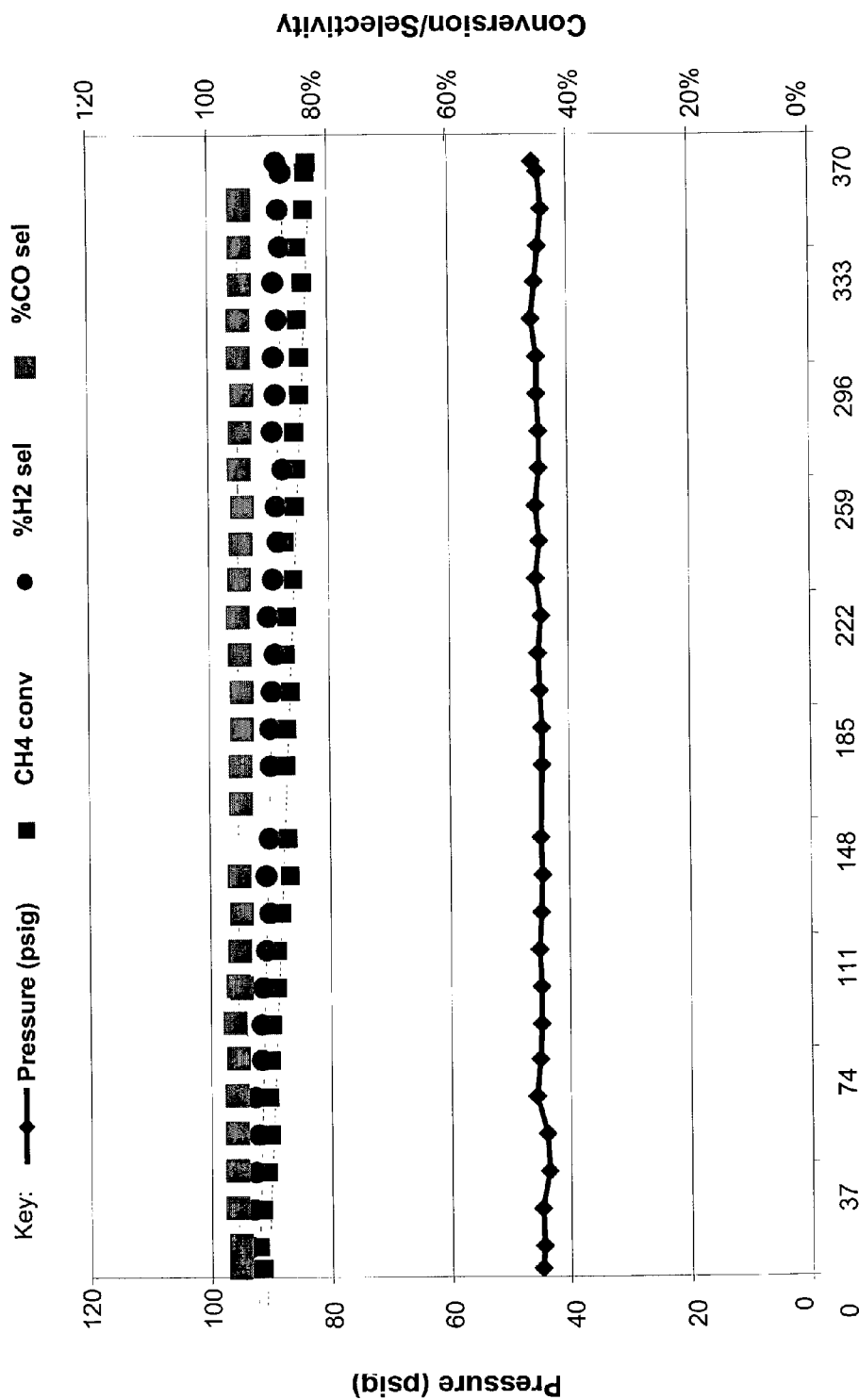
FIG. 25 is a graph showing catalyst performance of the catalyst of FIGS. 2A–B (Catalyst No. 1) for syngas production according to an embodiment of the present invention.

4% Rh/4% Sm on 1 mm Alumina Spheres 1 mm alumina spheres (1.3 mm average diameter; range approximately 1.15 to 1.5 mm, with most in the 1.2–1.3 mm range) having the BET surface area, BJH desorption surface area, BJH desorption pore volume and BJH desorption average pore diameter (measured using $N_2$ as the adsorptive) given in Table 1 were obtained from Norpro, Akron, Ohio. The pore volume distribution (BJH desorption dV/dD) of the approximately 2.5–100 nm pore diameter range spheres is shown in FIG. 1A. The corresponding pore area distribution of the same spheres is shown in FIG. 1B. A quantity of spheres were immersed in an aqueous solution of $Sm(NO_3)_3 \cdot 5H_2O$ (Aldrich) for wet impregnation, then allowed to dry on a hotplate. The impregnated spheres were calcined in air according to the following schedule: 5° C./min ramp to 325° C., hold at 325° C. for 1 h, 5° C./min ramp to 700° C., hold at 700° C. for 2 h, cool down to room temperature. The calcined Sm-containing spheres were then immersed in an aqueous solution of $RhCl_3 \cdot xH_2O$ (Aldrich) for wet impregnation, and then allowed to dry on a hotplate. The Rh impregnated spheres were calcined in air according to the following schedule: 5° C./min ramp to 325° C., hold at 325° C. for 1 h, 5° C./min ramp to 700° C., hold at 700° C. for 2 h, cool down to room temperature. This material was then reduced at 500° C. for 3 h under a stream of 300 mL/min $H_2$ and 300 mL/min $N_2$. The concentrations of the Rh and Sm solutions and the amounts loaded onto the selected quantity of spheres, were chosen so as to provide that the final catalyst contained 4 wt % Rh and 4 wt % Sm (based on total weight of the final catalyst). A 1.2 mL sample of the 4% Rh/4% Sm loaded spheres was evaluated in both a laboratory scale and a pilot-scale syngas production reactor as described in the respective Test Procedures, below. The light-off temperature and the presence or absence of supplemental propane is shown for Catalyst No. 1 in Table 1, for the lab scale studies. FIG. 24 is a graph showing the catalyst performance of this representative catalyst in the 13 mm pilot scale reactor over a three day syngas production run. FIG. 25 is a graph showing the catalyst performance of this catalyst in the 38 mm pilot scale reactor over a 370 hour syngas production run. The pore volume and pore area characteristics for the pre-impregnation alumina support are shown in FIG. 1A and FIG. 1B, respectively. The pores range from about 0.5 nm to 200 nm in diameter. The micro-pores ($\leq 1$ nm) contribute to the high surface area and meso-macro pores (>1–10 nm and >10 nm) account for most of the pore volume. FIGS. 2A–B show the pore volume and pore area distribution properties of the final catalyst (i.e., the prepared catalyst before use in the CPOX reactor) over the approximately 2.5–100 nm diameter pore size range (Catalyst No. 1). The data shown in FIGS. 1–22 are based on BJH desorption (dV/dD and dA/dD) using $N_2$ as the adsorptive species, as described below in the section titled "Measurement of BET Surface Area and Pore Size Distribution Using $N_2$ as Adsorptive."

EXAMPLE 2

Figure 3B:
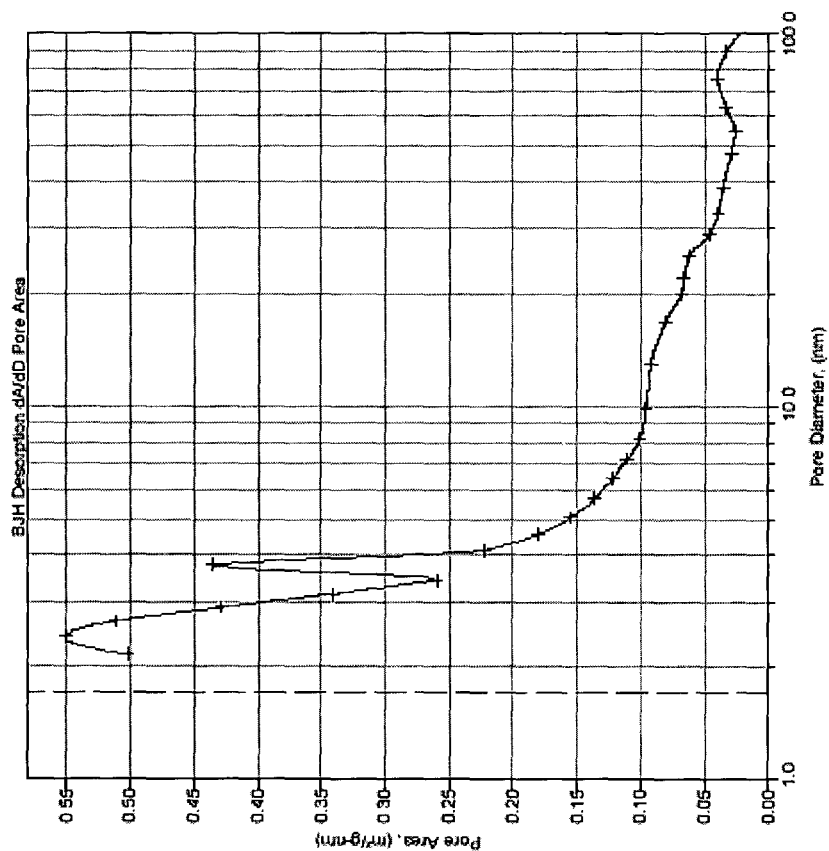
FIG. 3B is a graph showing the pore surface area over the pore diameter range of the same support as in FIG. 3A.
Figure 3A:
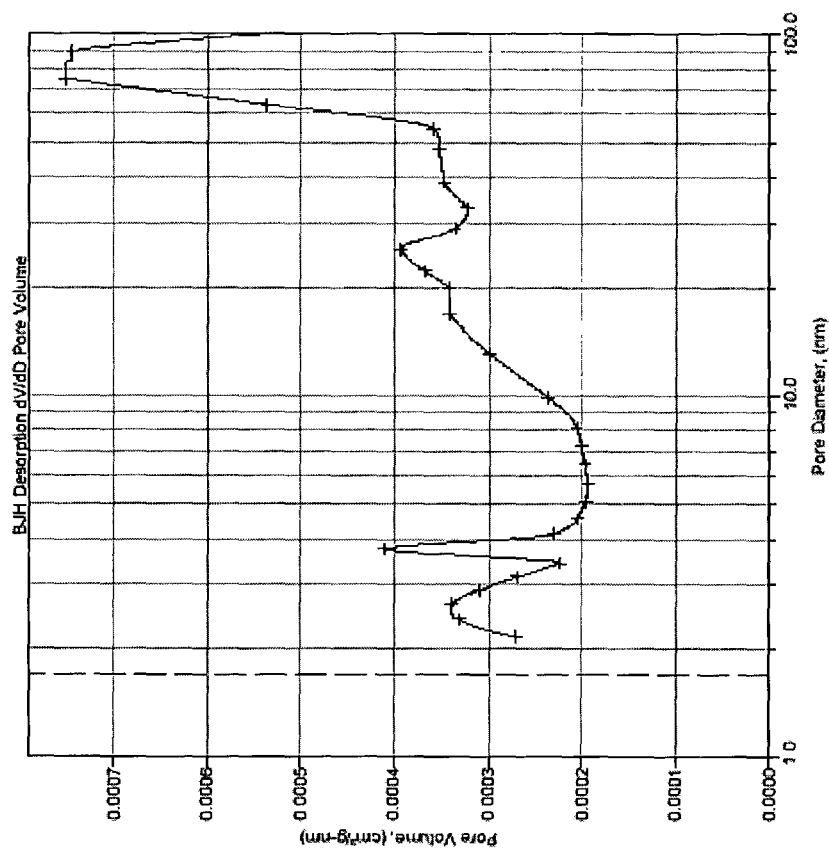
FIG. 3A is a graph showing the pore volume over the pore diameter range of the alumina support used to make the Rh—Sm/MgO—$Al_2O_3$ composition of Catalyst No. 2 and the Rh/MgO—$Al_2O_3$ composition of Catalyst No. 3.
Figure 4B:
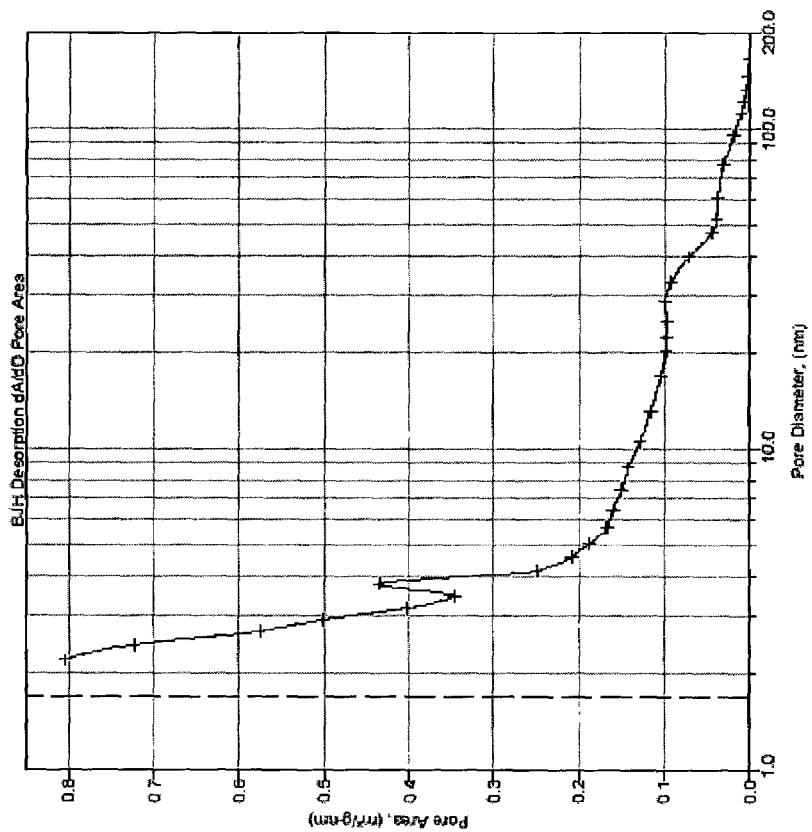
FIG. 4B is a graph showing the pore surface area over the pore diameter range of the same catalyst as in FIG. 4A.
Figure 4A:
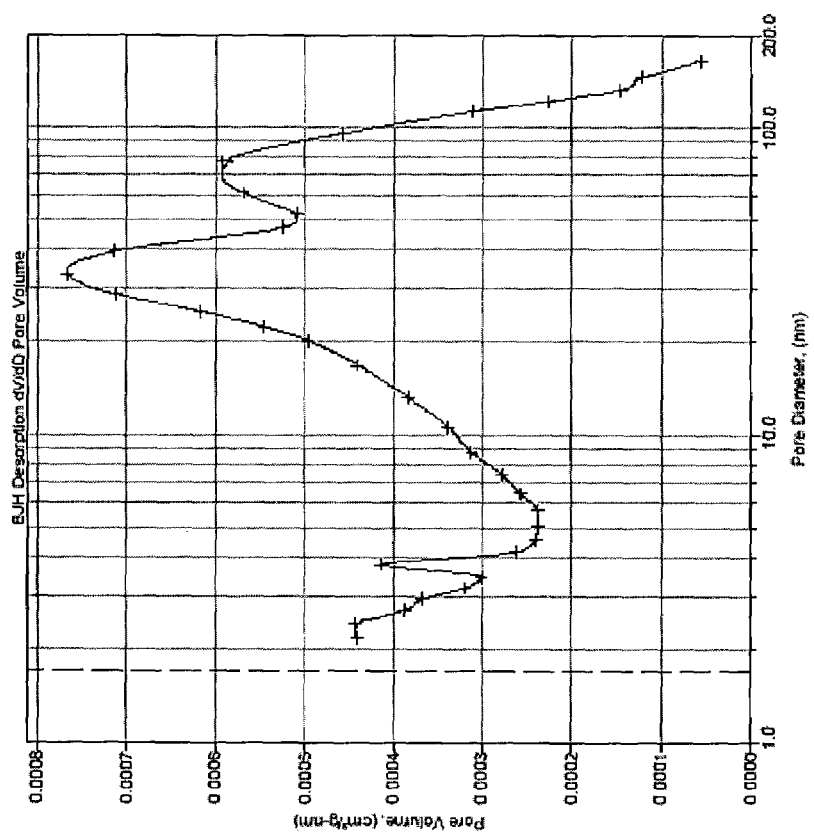
FIG. 4A is a graph showing the pore volume over the pore diameter range of the Rh—Sm impregnated alumina support of FIGS. 3A–B (Catalyst No. 2).

4% Rh/4% Sm on 1 mm MgO Modified Alumina Spheres 1 mm diameter MgO modified alumina spheres were also obtained from Norpro and were impregnated as described in Example 1 to yield a 4% Rh/4% Sm catalyst (Catalyst No. 2). A catalyst containing 4% Rh was prepared similarly, except the Sm impregnation step was omitted, to provide Catalyst No. 3. The BET surface area, BJH desorption surface area, BJH desorption pore volume and BJH desorption average pore diameter (measured using $N_2$ as adsorptive) for the pre-impregnation supports used for making Catalyst Nos. 2 and 3 are given in Table 1. The same parameters for the final Catalyst No. 2 is also given in Table 1. Catalyst Nos. 2 and 3 were evaluated as described in "Test Procedure—Laboratory Scale," and the results are also shown in Table 1. The pore volume and pore area distributions for the support are shown in FIGS. 3A and 3B, respectively. The pore volume and pore area distributions for the final Catalyst No. 2 are shown in FIGS. 4A and 4B, respectively.

EXAMPLE 3

4% Rh/4% Sm on 1 mm Alumina Spheres

Six lots of 1 mm diameter alumina spheres, each having different pore size characteristics, were custom prepared by Synetix, Billingham, Cleveland, England using its various available proprietary techniques, to provide 1 mm alumina spheres having approximately 4m²/g BET surface area. In Table 1 the BET surface area, BJH desorption surface area, BJH desorption pore volume and BJH desorption average pore diameter (measured using $N_2$ as adsorptive) are given for each of these lots which were used to make Catalyst Nos.

Figure 6:
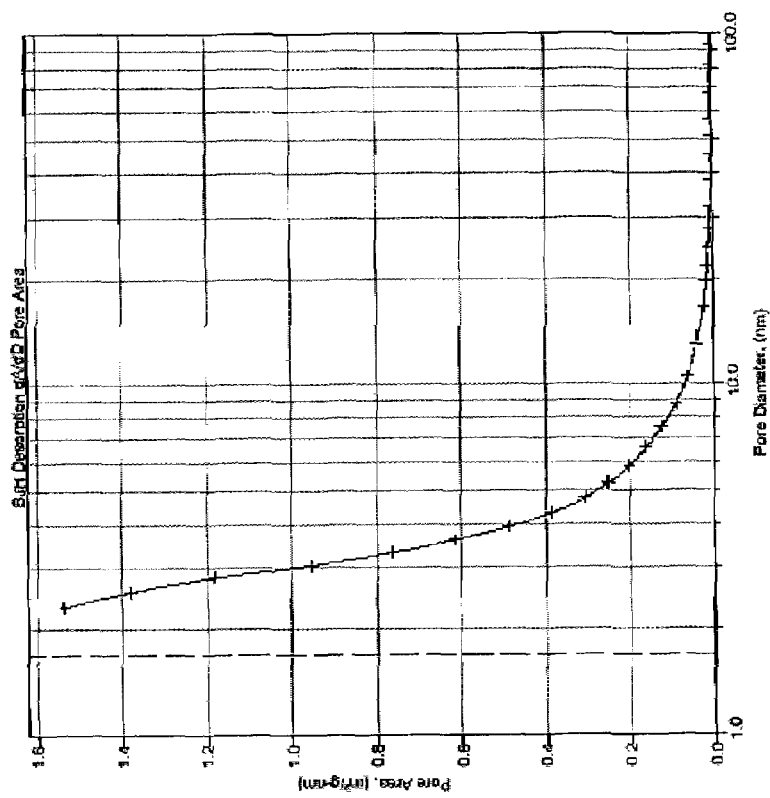
FIG. 6 is a graph showing the pore surface area over the pore diameter range of the same support as in FIG. 5.
Figure 5:
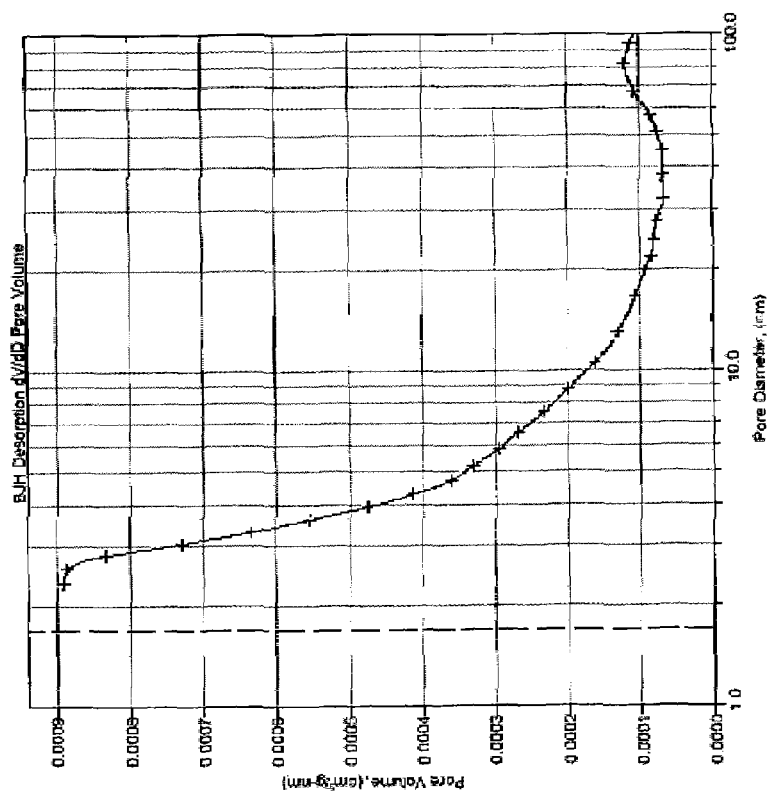
FIG. 5 is a graph showing the pore volume over the pore diameter range of the alumina support used to make the Rh—Sm/$Al_2O_3$ composition of Catalyst No. 4.
Figure 8:
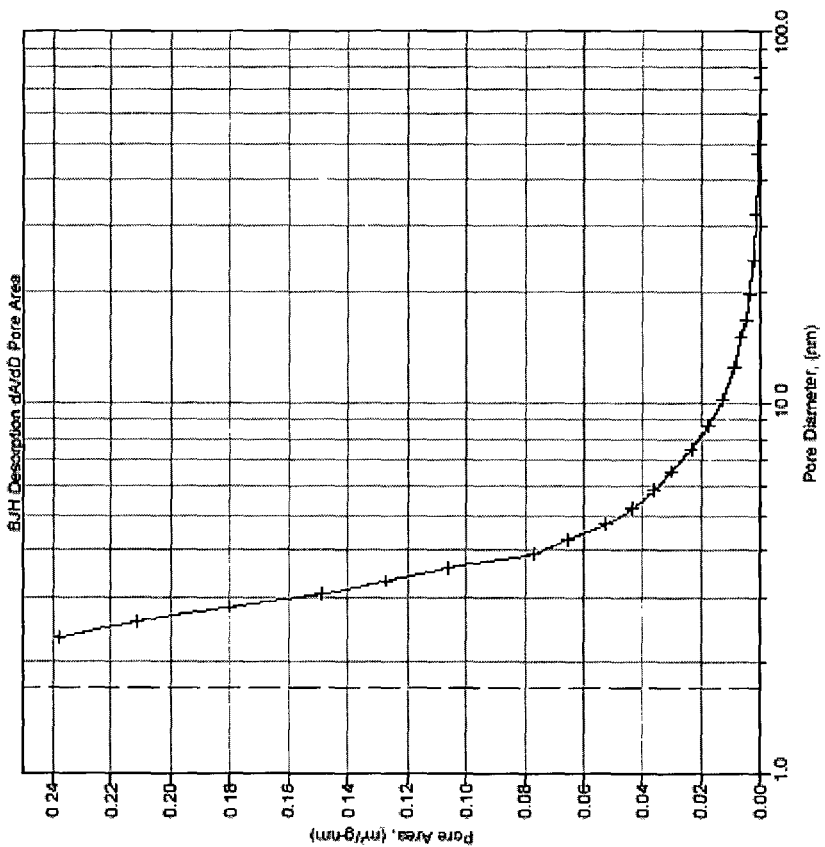
FIG. 8 is a graph showing the pore surface area over the pore diameter range of the same support as in FIG. 7.
Figure 7:
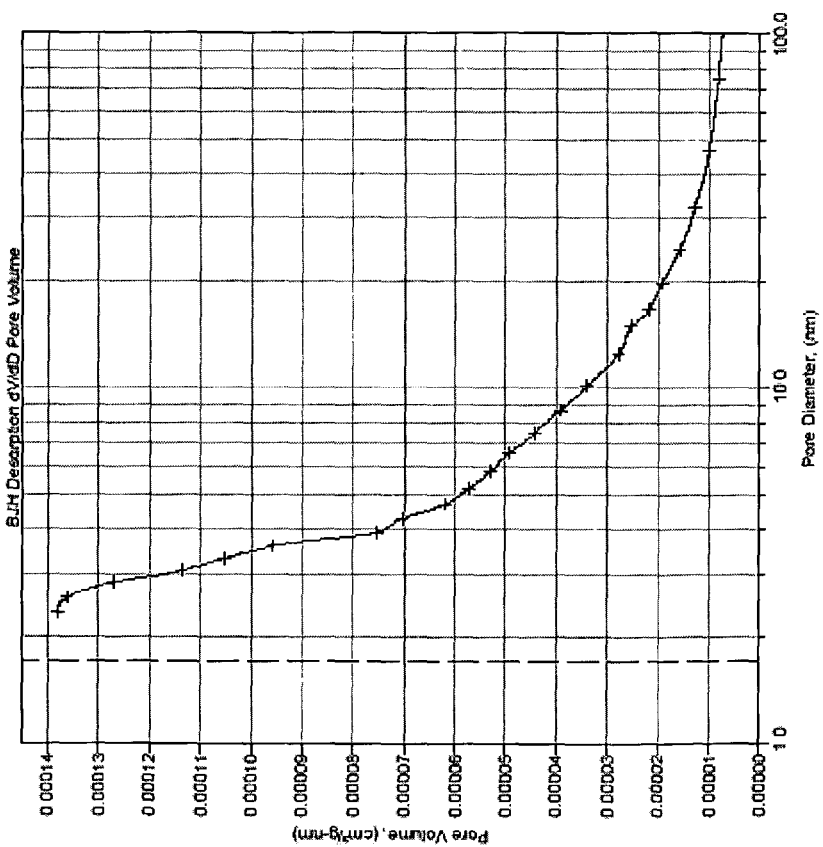
FIG. 7 is a graph showing the pore volume over the pore diameter range of the alumina support used to make the Rh—Sm/$Al_2O_3$ composition of Catalyst No. 5.
Figure 10:
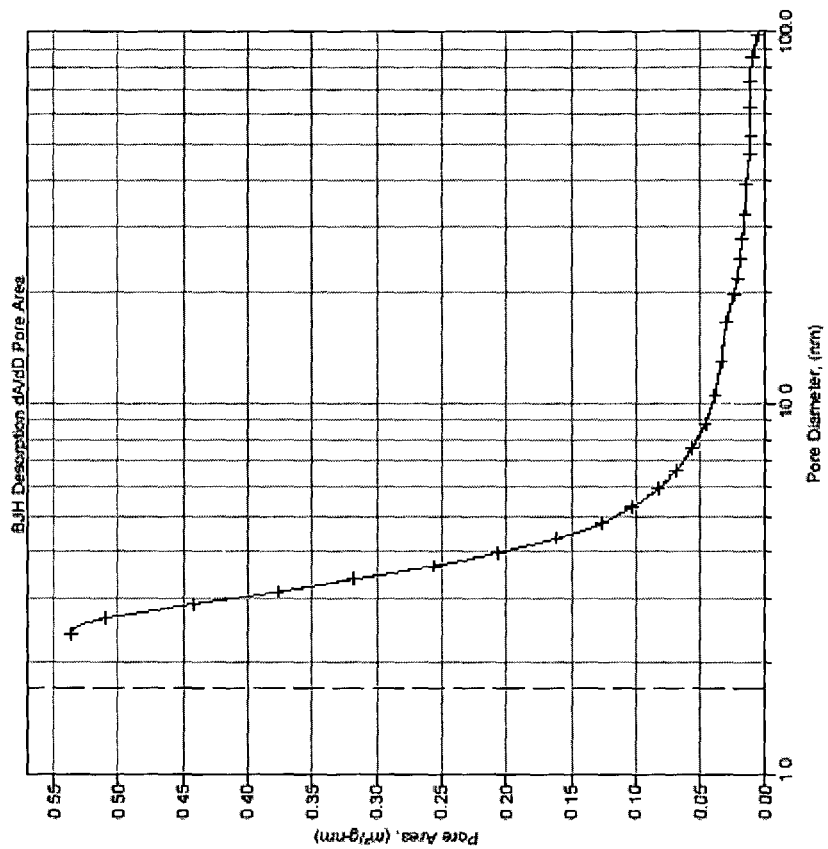
FIG. 10 is a graph showing the pore surface area over the pore diameter range of the same support as in FIG. 9.
Figure 9:
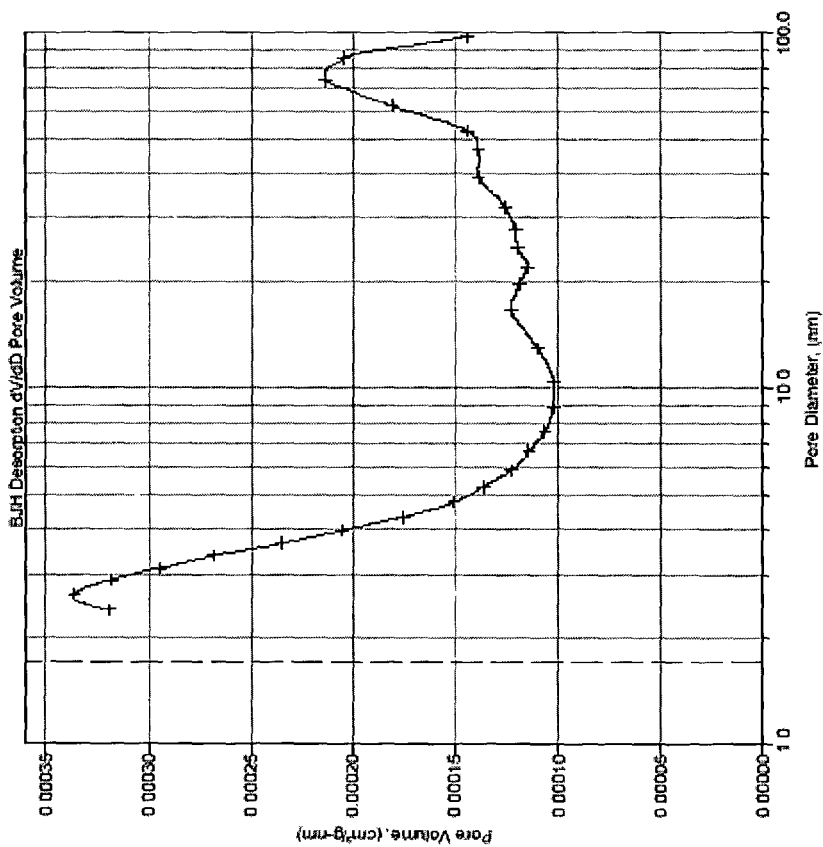
FIG. 9 is a graph showing the pore volume over the pore diameter range of the alumina support used to make the Rh—Sm/$Al_2O_3$ composition of Catalyst No. 6.
Figure 12:
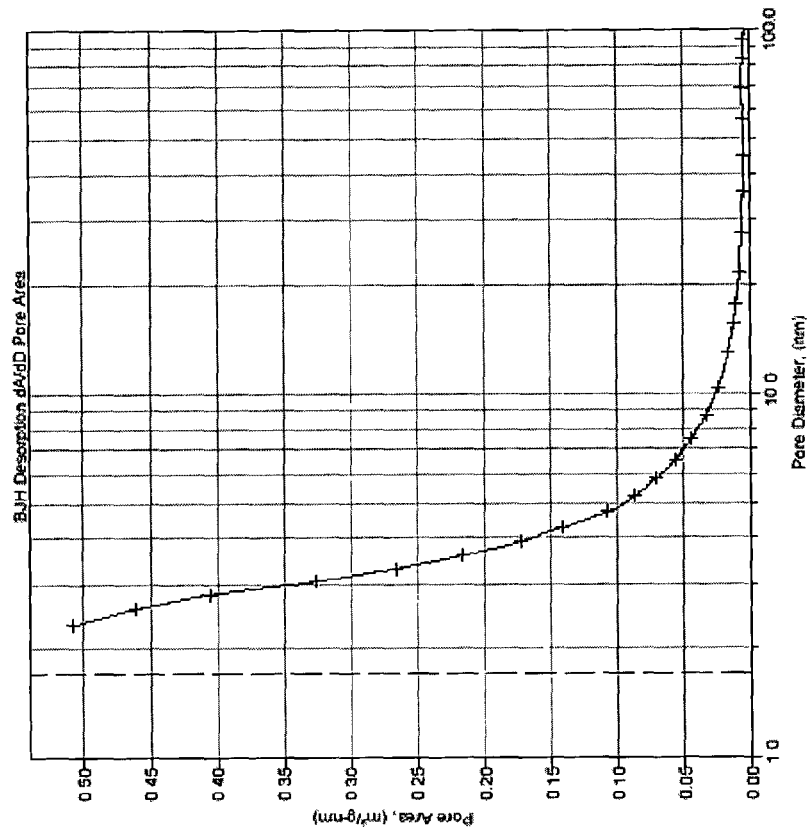
FIG. 12 is a graph showing the pore surface area over the pore diameter range of the same support as in FIG. 11.
Figure 11:
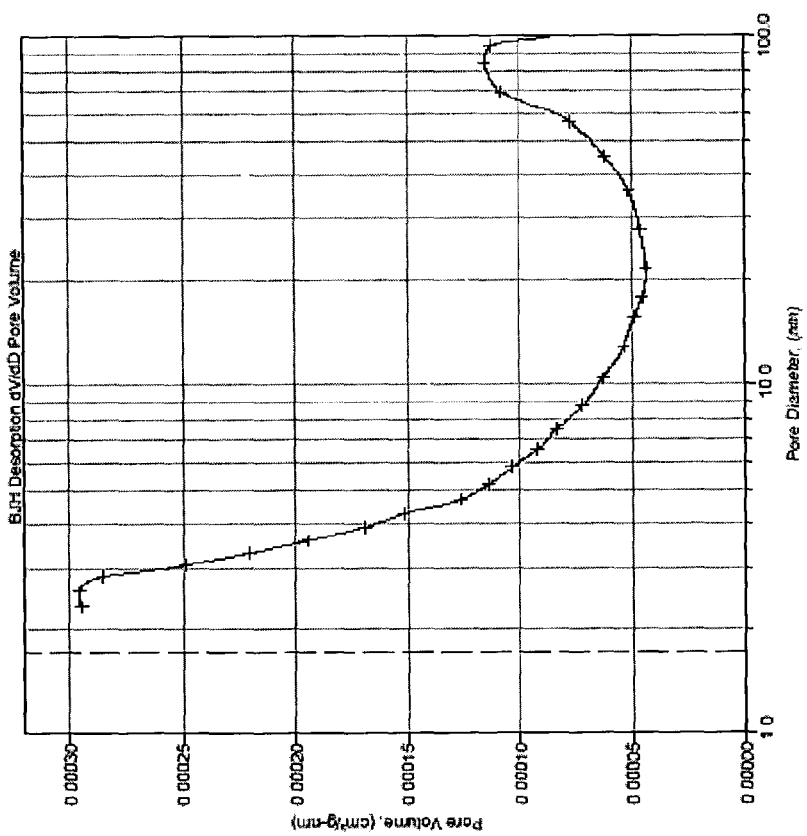
FIG. 11 is a graph showing the pore volume over the pore diameter range of the alumina support used to make the Rh—Sm/$Al_2O_3$ composition of Catalyst No. 7.
Figure 14:
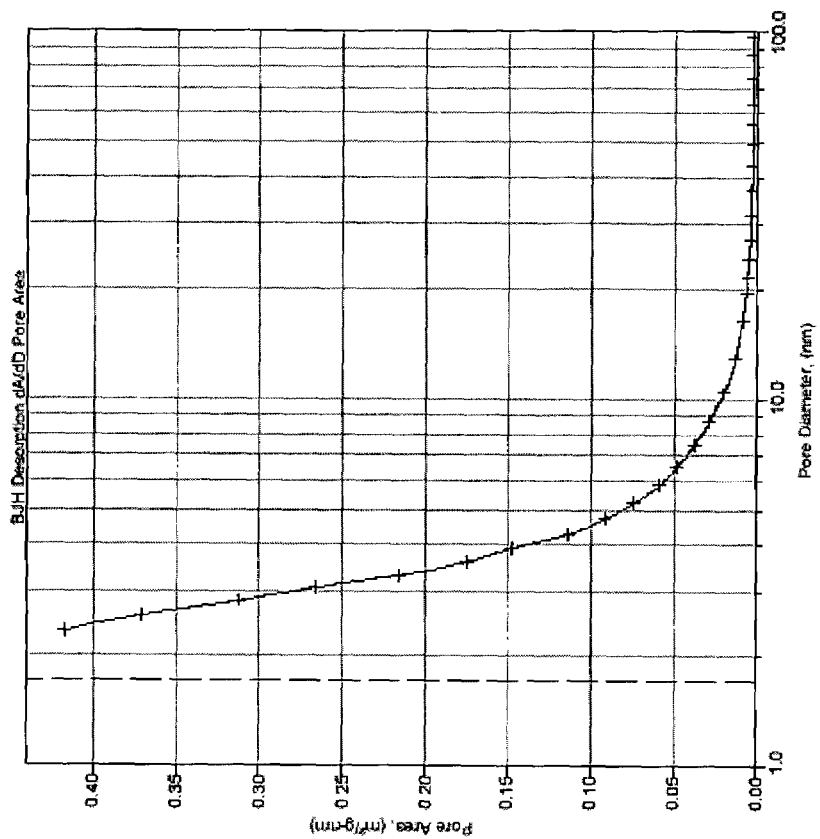
FIG. 14 is a graph showing the pore surface area over the pore diameter range of the same support as in FIG. 13.
Figure 13:
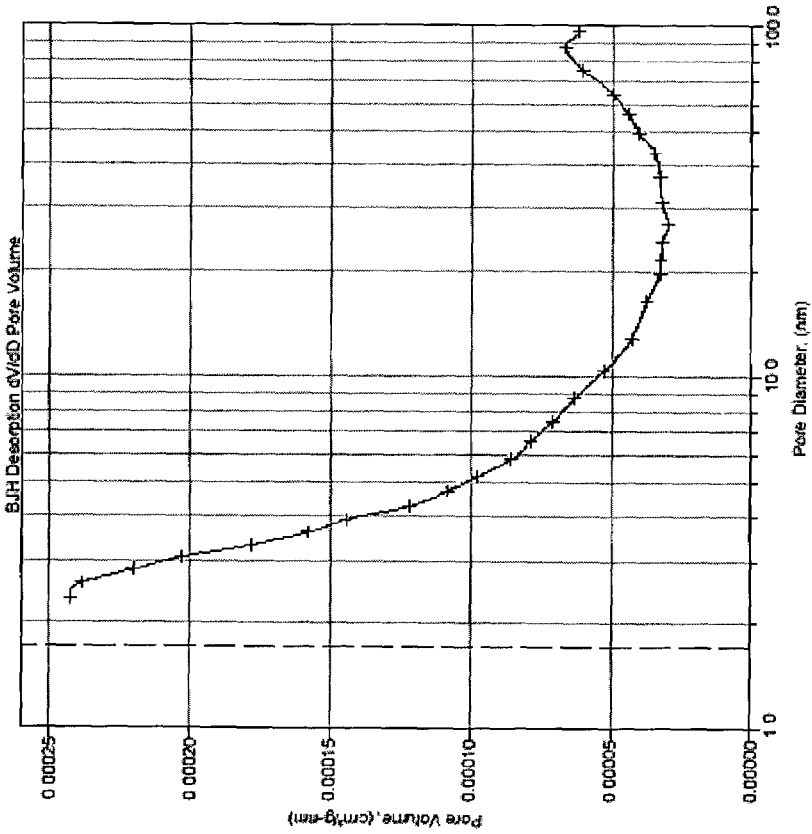
FIG. 13 is a graph showing the pore volume over the pore diameter range of the alumina support used to make the Rh—Sm/$Al_2O_3$ composition of Catalyst No. 8.
Figure 16:
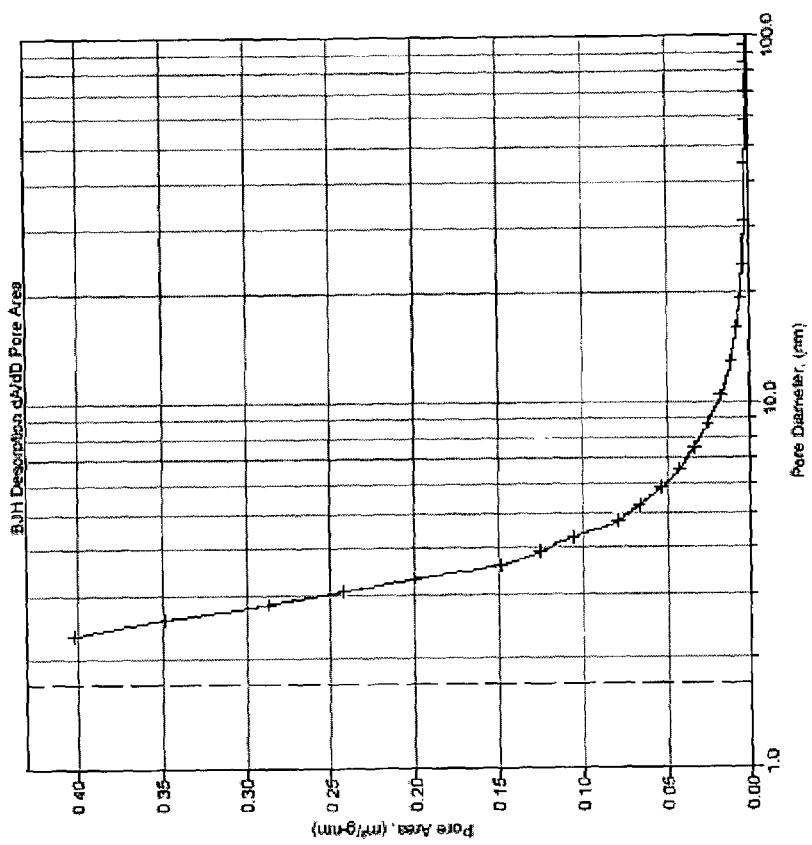
FIG. 16 is a graph showing the pore surface area over the pore diameter range of the same support as in FIG. 15.
Figure 15:
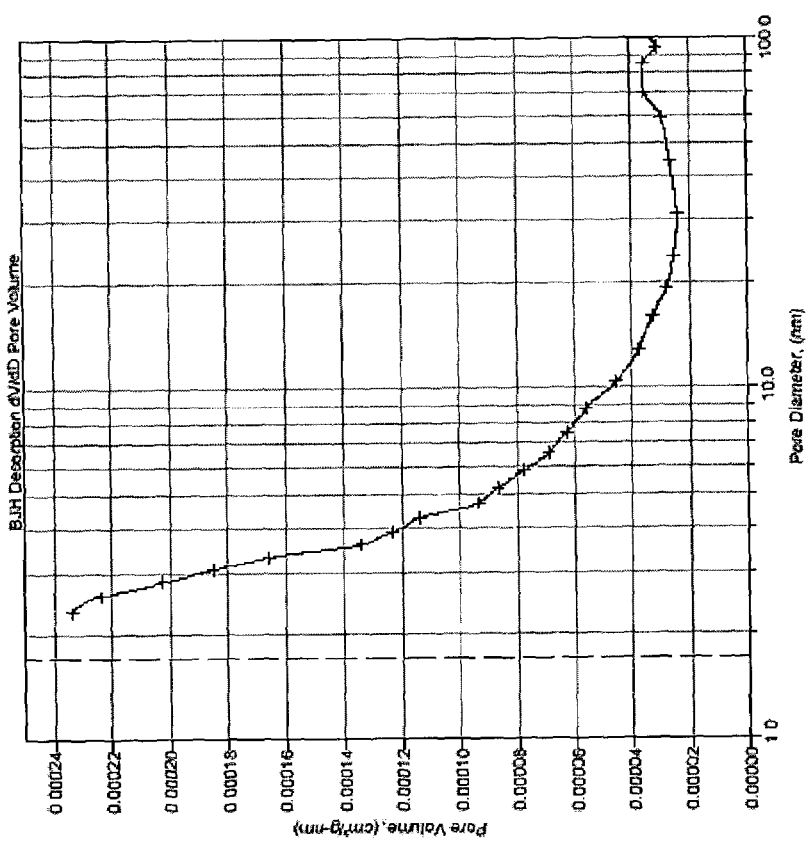
FIG. 15 is a graph showing the pore volume over the pore diameter range of the alumina support used to make the Rh—Sm/$Al_2O_3$ composition of Catalyst No. 9.
Figure 17B:
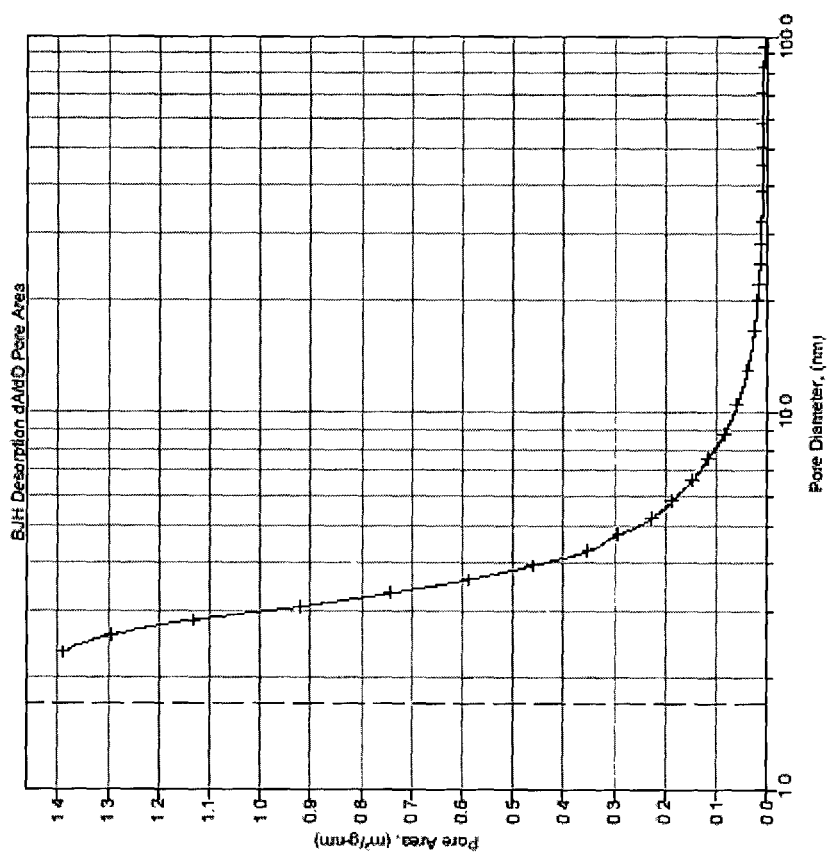
FIG. 17B is a graph showing the pore surface area over the pore diameter range of the same support as in FIG. 17A.
Figure 17A:
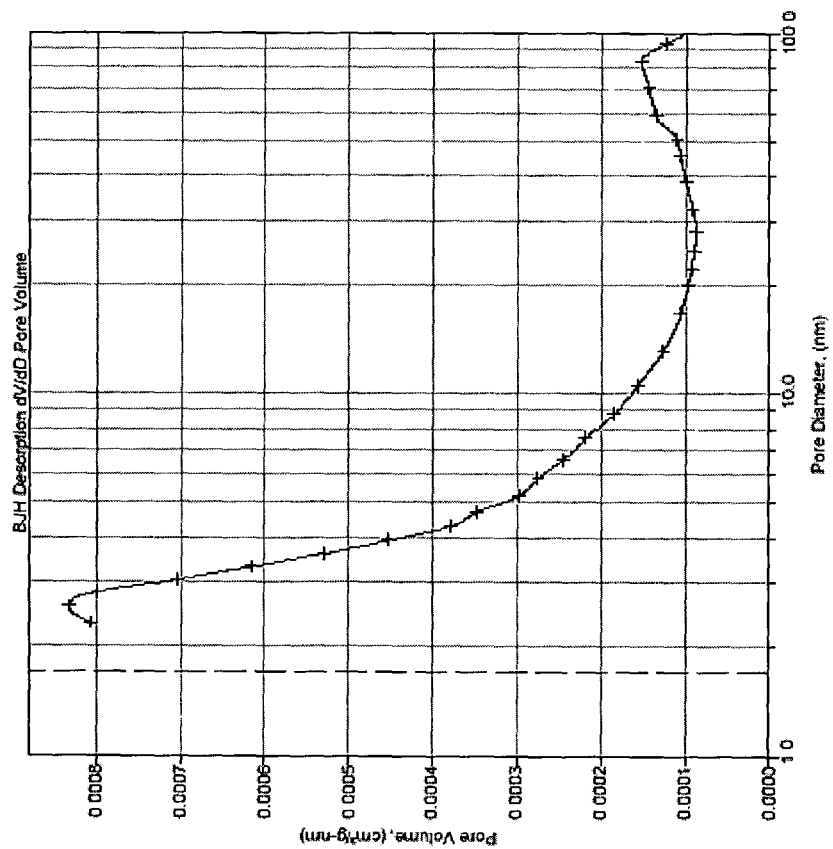
FIG. 17A is a graph showing the pore volume over the pore diameter range of the alumina support used to make the Rh—Sm/$Al_2O_3$ composition of Catalyst No. 10.
Figure 18B:
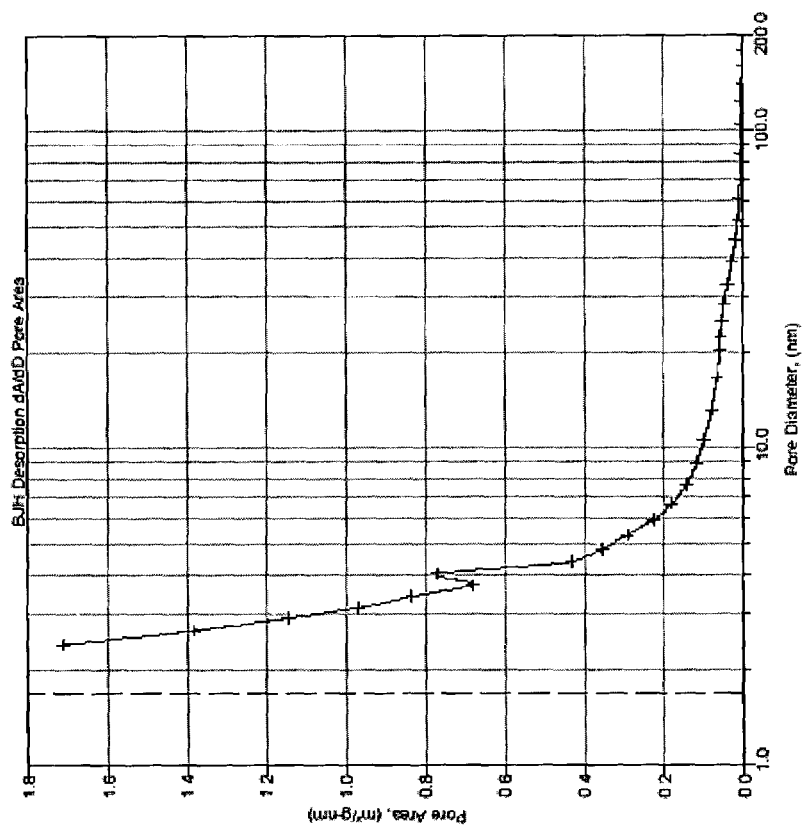
FIG. 18B is a graph showing the pore surface area over the pore diameter range of the same catalyst as in FIG. 18A.
Figure 18A:
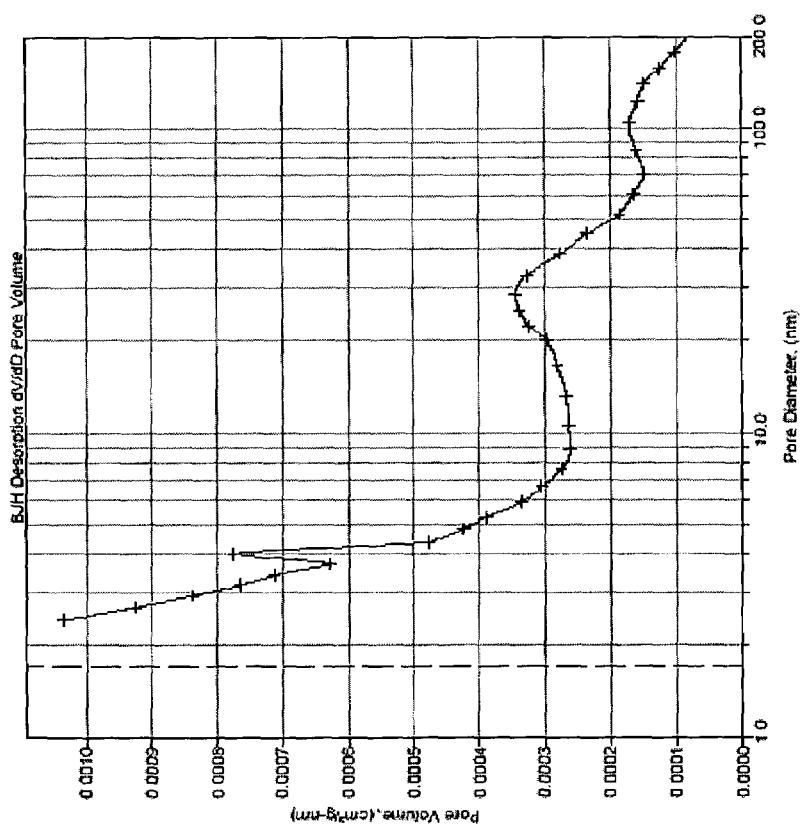
FIG. 18A is a graph showing the pore volume over the pore diameter range of the Rh—Sm impregnated alumina support of FIGS. 17A–B (Catalyst No. 10).

4–9, respectively. Samples from each lot were impregnated as described in Example 1, yielding Catalyst Nos. 4–9, each containing 4% Rh/4% Sm. The catalysts was tested as described in "Test Procedure—Laboratory Scale." The ability of the compositions to enhance light-off with or without added propane shown in Table 1. The pore volume and pore area characteristics for Catalyst No. 4 are shown in FIGS. 5 and 6. Similarly, the pore volume and pore area characteristics for Catalyst Nos. 5–9 are shown in FIGS. 7–16, respectively.

EXAMPLE 4

4% Rh/4% Sm on 1 mm Alumina Spheres

A catalyst was prepared as described in Examples 2 and 3, except the support material was obtained from still another commercial supplier and had somewhat different BET surface area, BJH desorption surface area, BJH desorption pore volume and BJH desorption average pore diameter (measured using $N_2$ as adsorptive) characteristics compared to the alumina spheres obtained from other vendors, as shown in Table 1. In the present example, 1 mm diameter alumina spheres obtained from Sud-chemie, Louisville, Ky. were impregnated as described in Example 1, to yield a 4% Rh/4% Sm catalyst (Catalyst No. 10). Catalyst No. 10 was also evaluated as previously described, and its ability to enhance light-off is indicated in Table 1. The pore volume and pore area characteristics for the pre-impregnation support and for the final prepared catalyst are shown in FIGS. 17A–B and 18A–B, respectively.

EXAMPLE 5

4% Rh/4% Sm on 35–50 Mesh or 16–20 Mesh Alumina Particles

35–50 mesh (about 0.3 to 0.5 mm diameter) alumina particles having the BET surface area, BJH desorption surface area, BJH desorption pore volume and BJH desorption average pore diameter (measured using $N_2$ as adsorptive) indicated for the support in Catalyst No. 11 in Table 1 were obtained from Sud-chemie, Louisville, Ky. These particles were impregnated as described in Example 1 to produce a produce a catalyst containing 4% Rh/4% Sm on 35–50 mesh alumina (Catalyst No. 11).

Figure 19B:
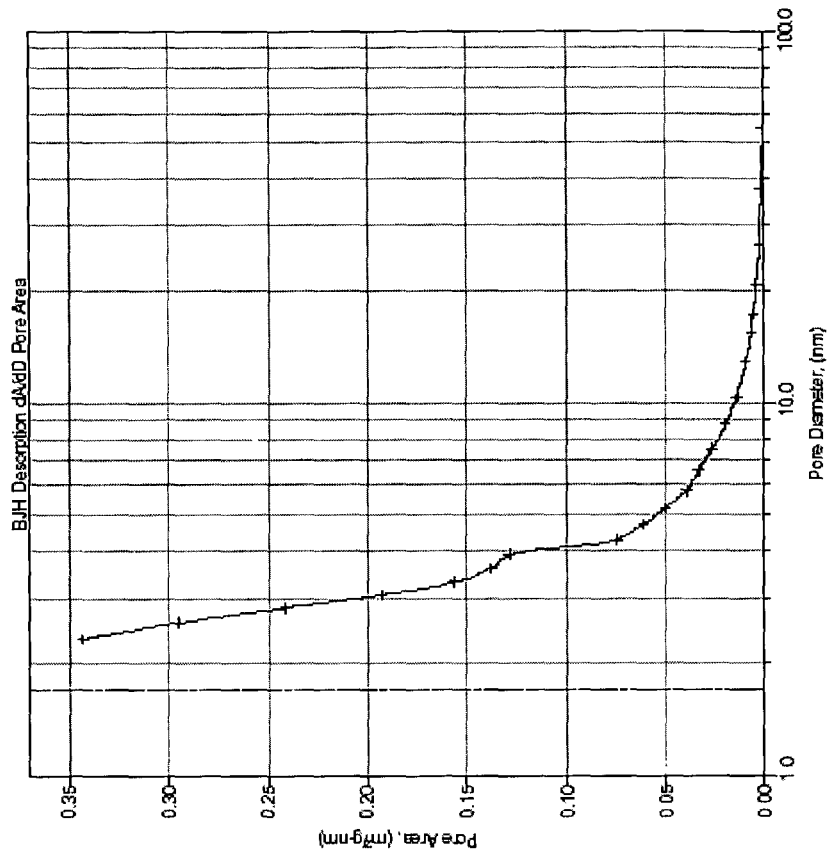
FIG. 19B is a graph showing the pore surface area over the pore diameter range of the same support as in FIG. 19A.
Figure 19A:
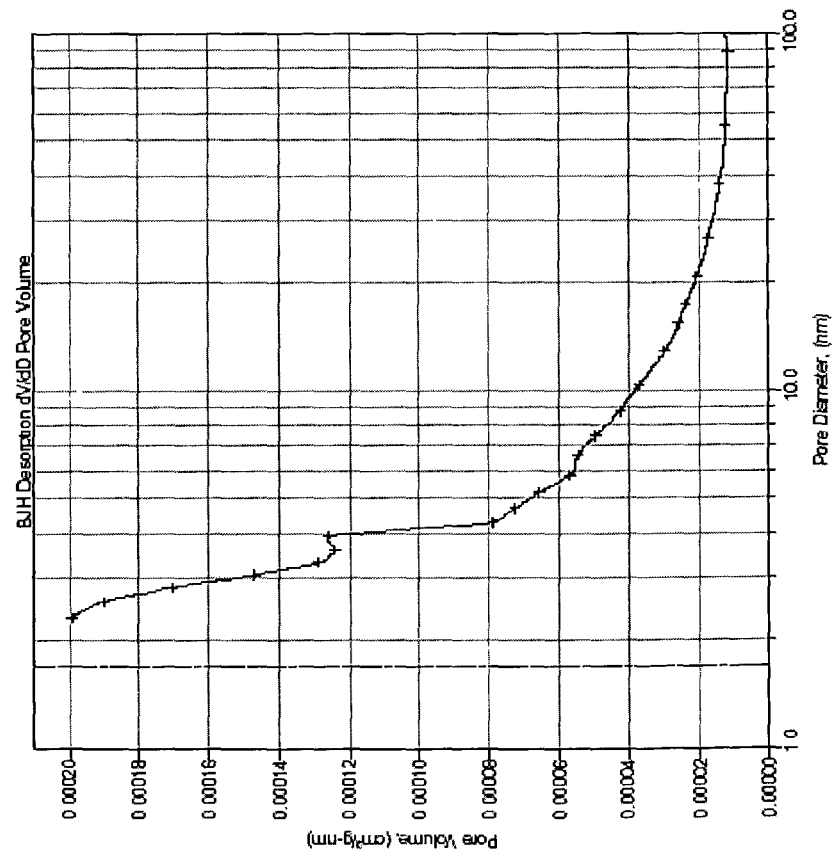
FIG. 19A is a graph showing the pore volume over the pore diameter range of the alumina support used to make the Rh—Sm/$Al_2O_3$ composition of Catalyst No. 11.
Figure 20B:
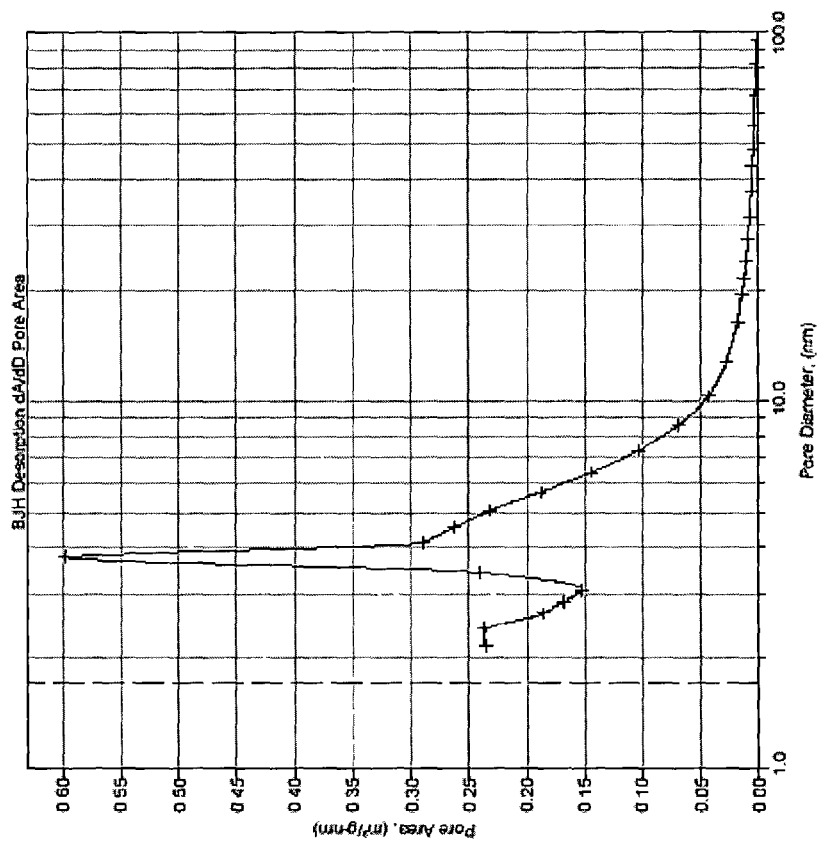
FIG. 20B is a graph showing the pore surface area over the pore diameter range of the same catalyst as in FIG. 20A.
Figure 20A:
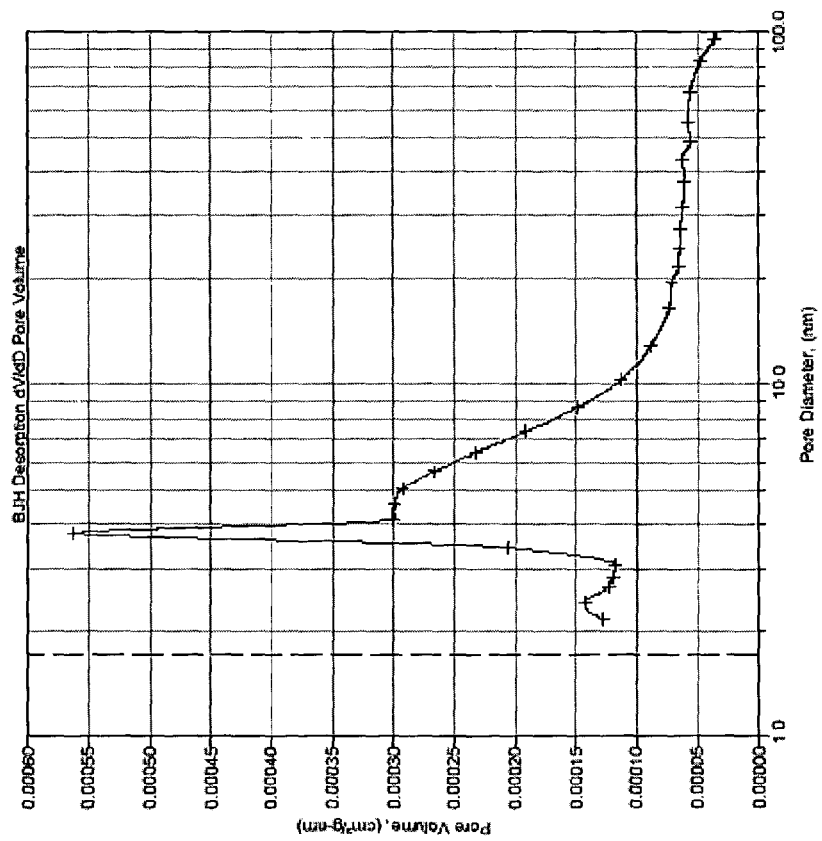
FIG. 20A is a graph showing the pore volume over the pore diameter range of the Rh—Sm impregnated alumina support of FIGS. 19A–B (Catalyst No. 1).
Figure 21B:
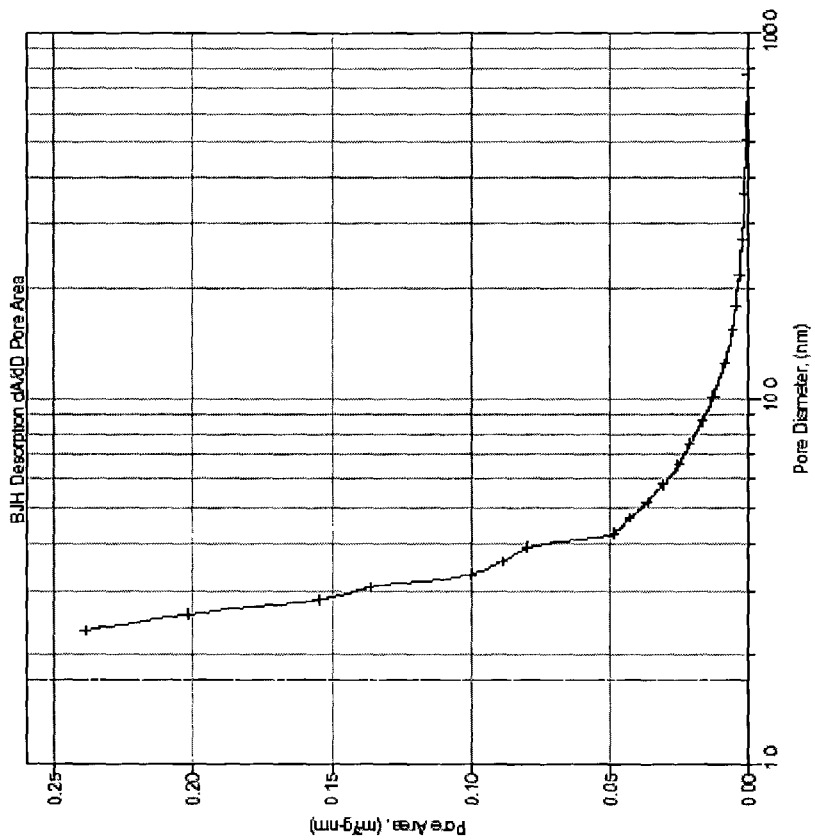
FIG. 21B is a graph showing the pore surface area over the pore diameter range of the same support as in FIG. 19.
Figure 21A:
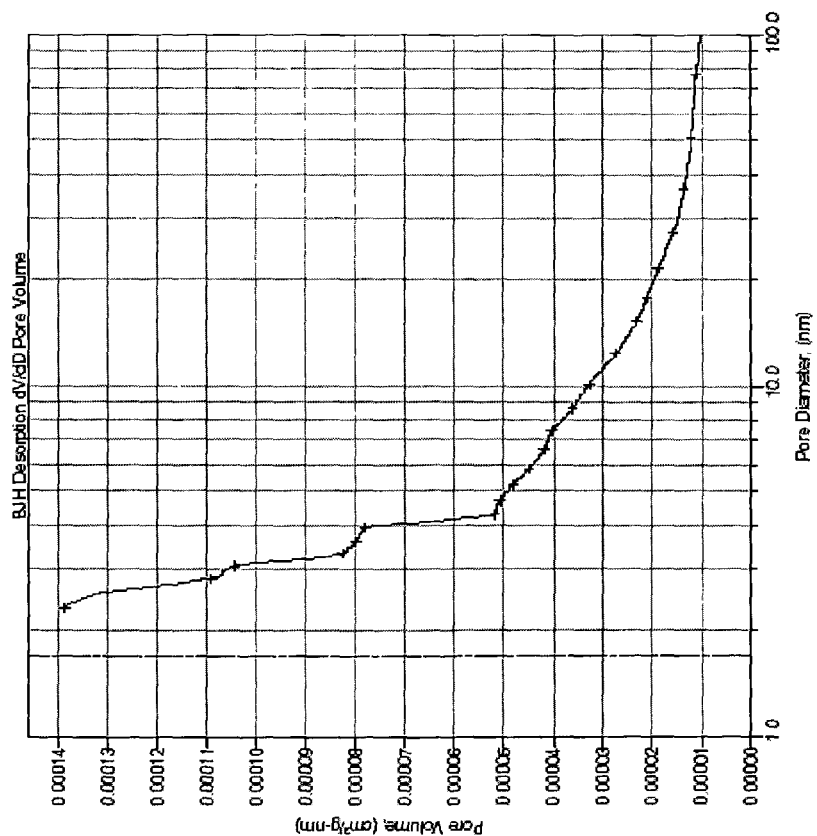
FIG. 21A is a graph showing the pore volume over the pore diameter range of the 35–50 mesh alumina support used to make the Rh—Sm/$Al_2O_3$ composition of Catalyst No. 12.
Figure 22B:
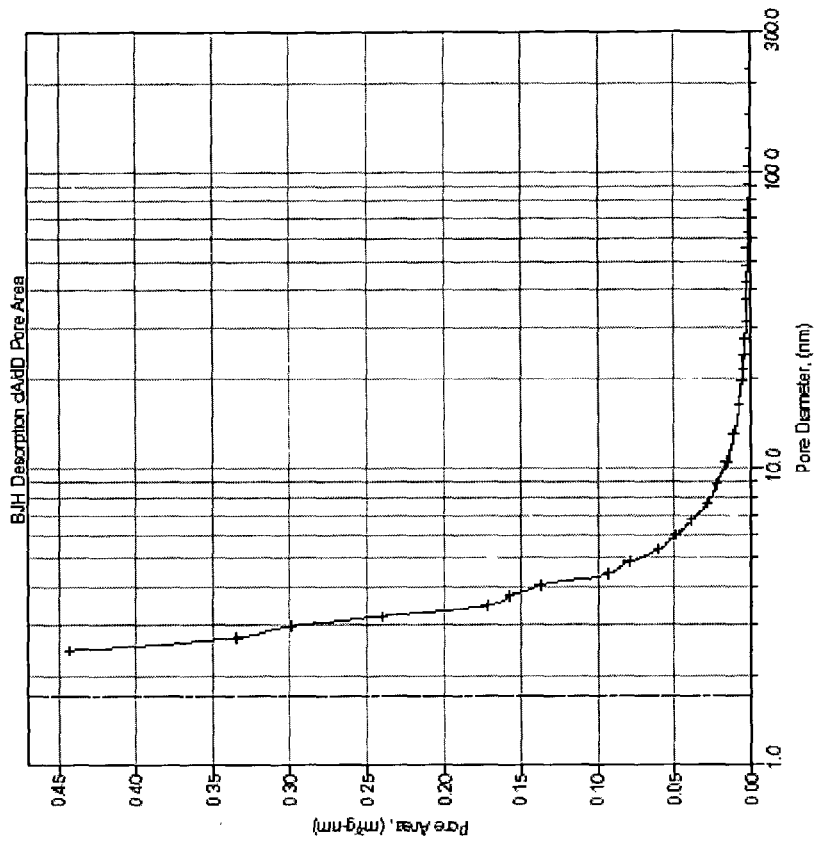
FIG. 22B is a graph showing the pore surface area over the pore diameter range of the same support as in FIGS. 21A–B.
Figure 22A:
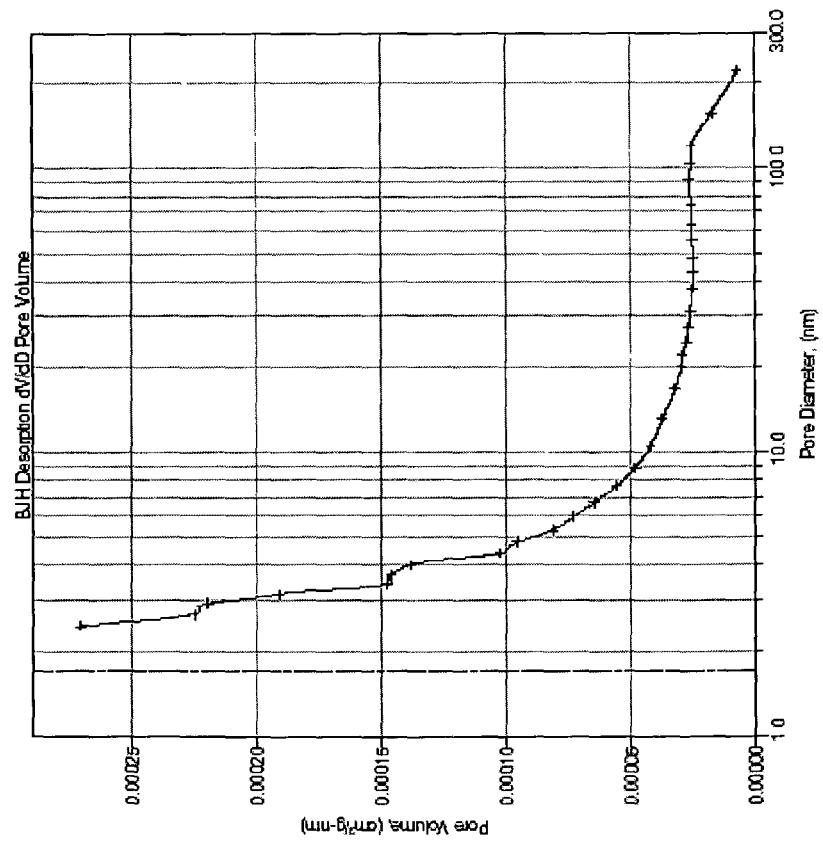
FIG. 22A is a graph showing the pore volume over the pore diameter range of the 16–20 mesh alumina support used to make the Rh—Sm/$Al_2O_3$ composition of Catalyst No. 12.

Similarly, 16–20 mesh (about 0.8 to 1 mm diameter) alumina particles having the BET surface area, BJH desorption surface area, BJH desorption pore volume and BJH desorption average pore diameter given for the support in Catalyst No. 12 in Table 1 were obtained from the same commercial supplier, and were similarly loaded with Rh and Sm. These 16–20 mesh catalyst particles were evaluated as described in the "Test Procedure—Laboratory Scale." Their ability to enhance light-off with or without propane are noted in Table 1. The pore volume and pore area characteristics for the 35–50 mesh support are shown in FIGS. 19A–B, respectively. The pore volume and pore area characteristics for the final Catalyst No. 11 (on the 35–50 mesh support) are shown in FIGS. 20A and 20B. The pore volume and pore area characteristics for the 16–20 mesh support and the final Catalyst No. 12 (on the 16–20 mesh support) are shown in FIGS. 21A–B and 22A–B, respectively.

Figure 23A:
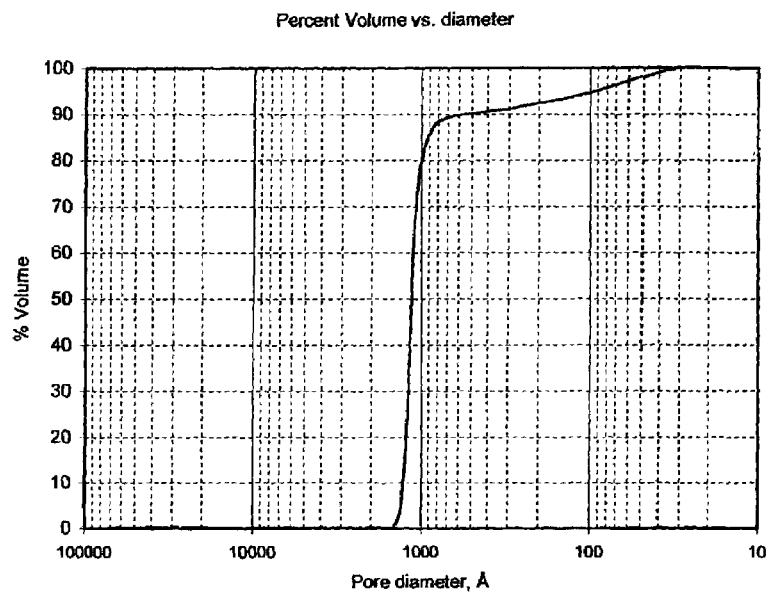
FIG. 23A is a graph of pore volume (%) versus diameter for the support in Catalyst No. 1, measured by mercury intrusion porosimetry.
Figure 23B:
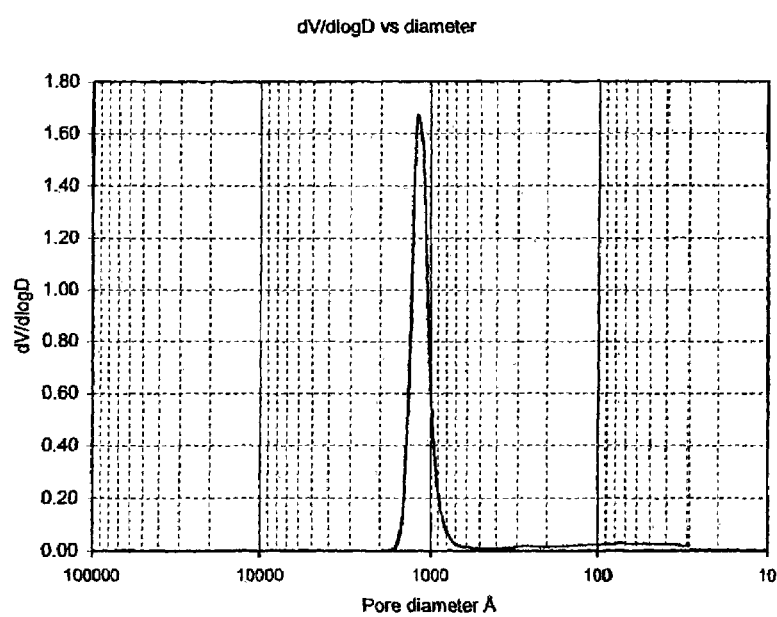
FIG. 23B is a graph of dV/dlogD versus pore diameter for the support of FIG. 23A.

Catalyst Nos. 1–3, 4 and 10 are especially desirable because no supplemental propane feed was necessary to initiate the catalytic partial oxidation reaction and the light-off temperatures were very low (i.e., 330° C. or less), as shown in Table 1. Physical properties of the pores of the support material used in Example 1 (Catalyst No. 1) measured by mercury intrusion porosimetry are shown in FIGS. 23A–B. A plot of % pore volume vs. pore diameter is shown in FIG. 23A for pore volume=0.24 cc/g. The median pore diameter (volume) is 1142 Å (about 114 nm). FIG. 23B is a plot of dV/d log D vs. pore diameter. Table 2 summarizes the average pore diameter (4V/A) for the supports used to make Catalyst Nos. 1, 4 and 10, as determined using mercury porosimetry, as described below.

TABLE 2

Pore Size Characteristics of Alumina Supports

| Catalyst No. | Average Pore Diameter (4V/A)* |
|---|---|
| 1 | 0.11 μm |
| 4 | 0.11 μm |
| 10 | 0.20 μm |

* measured by mercury intrusion porosimetry

Test Procedure—Laboratory Scale

The catalysts were evaluated for their ability to catalyze the partial oxidation reaction in a conventional flow apparatus using a quartz reactor with a length of 12 inches, an outside diameter of 19 mm and an inside diameter of 13 mm. Ceramic foam pieces of 99% $Al_2O_3$ (12 mm outside diameter×5 mm thick, with 45 pores per linear inch) were placed before and after the catalyst as radiation shields. The inlet radiation shield also aided in uniform distribution of the feed gases. An Inconel-sheathed, single point K-type (Chromel/Alumel) thermocouple was placed axially inside the reactor, touching the top (inlet) face of the radiation shield. A high temperature S-Type (Pt/Pt 10% Rh) bare-wire thermocouple was positioned axially touching the bottom face of the catalyst, and was used to indicate the reaction temperature. The catalyst and the two radiation shields were tightly sealed against the inside walls of the quartz reactor by wrapping the shields radially with a high purity (99.5%) alumina paper. A 600-watt band heater set at 90% electrical output was placed around the quartz tube, providing heat to light off the reaction and preheat the feed gases. The bottom of the band heater corresponded to the top of the upper radiation shield.

In addition to the thermocouples placed above and below the catalyst, the reactor also contained two axially positioned, triple-point thermocouples, one before and another after the catalyst. These triple-point thermocouples were used to determine the temperature profiles of the reactants and products that were subjected to preheating and quenching, respectively.

The runs were conducted at a $CH_4:O_2$ molar ratio of 1.75:1–2:1 with a combined flow rate of about 3.8–7.7 SLPM (standard liters per minute), corresponding to a gas hourly space velocity of 192,300–384,600 $hr^{-1}$ and at a pressure of 5 psig (136 kPa). The reactor effluent was analyzed using a gas chromatograph equipped with a thermal conductivity detector.

Test Procedure—13 mm Pilot Scale Reactor

The partial oxidation reactions were carried out in a conventional flow apparatus using a 19 mm O.D.×13 mm I.D. quartz insert embedded inside a refractory-lined steel vessel. The quartz insert contained a 12 mm O.D.×15 mm high granular or particulate catalyst bed packed between two foam disks. The upper disk typically consisted of 65-ppi PSZ and the bottom disk typically consisted of 30-ppi zirconia-toughened alumina. Preheating the methane or natural gas that flowed through the catalyst system provided the heat needed to start the reaction. Oxygen was mixed with the methane or natural gas immediately before the mixture entered the catalyst system. During lightoff, the mass oxygen to natural gas ratio is typically in the range of 0.1 to 0.5. The reactor pressure ranges from 0 to 100 psig. The methane or natural gas was spiked with propane as needed to initiate the partial oxidation reaction, then the propane was removed as soon as the reaction commenced. Once the partial oxidation reaction commenced, the reaction proceeded autothermally. Two Type K thermocouples with ceramic sheaths were used to measure catalyst inlet and outlet temperatures. The molar ratio of $CH_4$ to $O_2$ was generally about 2:1, however the relative amounts of the gases, the catalyst inlet temperature and the reactant gas pressure could be varied by the operator according to the parameters being evaluated (see Table 5). The product gas mixture was analyzed for $CH_4$, $O_2$, CO, $H_2$, $CO_2$ and $N_2$ using a gas chromatograph equipped with a thermal conductivity detector. A gas chromatograph equipped with flame ionization detector analyzed the gas mixture for $CH_4$, $C_2H_6$, $C_2H_4$ and $C_2H_2$. The $CH_4$ conversion levels and th and $H_2$ product selectivities obtained for each catalyst evaluated in this test system are considered predictive of the conversion and selectivities that will be obtained when the same catalyst is employed in a commercial scale short contact time reactor under similar conditions of reactant concentrations, temperature, reactant gas pressure and space velocity.

The performance of representative Catalyst 1 in catalyzing the production of synthesis gas in a pilot-scale reactor at 90 psig is shown in FIG. 24. Soon after startup, the measured $CH_4$ conversion was 91.8% and selectivity for $H_2$ and CO were 91.7 and 95.9%, respectively, and the operating temperature (catalyst floor) was 988° C. After 3 days on stream, activity and selectivity remained high (87.4% $CH_4$ conversion, 87.9% selectivity for $H_2$ and 94.4% selectivity for CO, and an operating temperature (catalyst floor) of 1095° C.

Test Procedure—38 mm Pilot Scale Reactor

Partial oxidation reactions were carried out in a conventional flow apparatus using a 44 mm O.D.×38 mm I.D. quartz insert embedded inside a refractory-lined steel vessel. The quartz insert contained a catalyst bed containing at least one porous monolith catalyst (~37 mm O.D.×10–15 mm high) held between two foam disks. The upper disk typically consisted of 65-ppi partially-stabilized zirconia and the bottom disk typically consisted of 30-ppi zirconia-toughened alumina. Preheating the methane or natural gas that flowed through the catalyst bed provided the heat needed to start the reaction. Oxygen was mixed with the methane or natural gas immediately before the mixture entered the catalyst bed. The methane or natural gas was spiked with propane, or another combustable gas, as needed to initiate the partial oxidation reaction, then the propane was removed as soon as the reaction initiated. Once the reaction was initiated, it proceeded autothermally. Two Type K thermocouples with ceramic sheaths were used to measure catalyst inlet and outlet temperatures. The molar ratio of $CH_4$ to $O_2$ was generally about 2:1, however the relative amounts of the gases, the catalyst inlet temperature and the reactant gas pressure could be varied by the operator according to the parameters being evaluated (see the test results for catalyst 1 in Table 5). The product gas mixture was analyzed for $CH_4$, $O_2$, CO, $H_2$, $CO_2$ and $N_2$ using a gas chromatograph equipped with a thermal conductivity detector. A gas chromatograph equipped with a flame ionization detector analyzed the gas mixture for $CH_4$, $C_2H_6$, $C_2H_4$ and $C_2H_2$. The $CH_4$ conversion levels and the CO and $H_2$ product selectivities obtained for each catalyst monolith evaluated in this test system are considered predictive of the conversion and selectivities that will be obtained when the same catalyst is employed in a commercial scale short contact time reactor under similar conditions of reactant concentrations, temperature, reactant gas pressure and space velocity.

TABLE 1

Surface Area and Volume Properties of Catalyst Supports and Catalysts*

| Example No. | Cat. No. | Catalytic Components | Support Material | Support Geometry | BET Surf. Area ($m^2/g$) Sup. | Cat. | BJH Desorp. Surf. Area of pore 1.7–300 nm ($m^2/g$) Sup. | Cat. | BJH Desorp. Pore V of pores 1.7–300 nm (cc/g) Sup. | Cat. | BJH Desorp. Avg. Pore Dia. (4V/A) (nm) Sup. | Cat. | Light-off Temp. (lab) | Propane Feed (lab) |
|---|---|---|---|---|---|---|---|---|---|---|---|---|---|---|
| 1 | 1 | 4% Rh/4% Sm | $Al_2O_3$ | 1 mm sphere | 4.4 | 6.4 | 3.9 | 6.2 | 0.01 | 0.06 | 12 | 38 | 283° C. | No |
| 2 | 2 | 4% Rh/4% Sm | $MgO/Al_2O_3$ | 1 mm sphere | 5.4 | 7.1 | 5.9 | 7.5 | 0.06 | 0.07 | 41 | 35 | 289° C. | No |
| 2 | 3 | 4% Rh | $MgO/Al_2O_3$ | 1 mm sphere | 5.4 | | 5.9 | | 0.06 | | 41 | | 280° C. | No |
| 3 | 4 | 4% Rh/4% Sm | $Al_2O_3$ | 1 mm sphere | 4.4 | | 3.9 | | 0.015 | | 16 | | 295° C. | No |
| 3 | 5 | 4% Rh/4% Sm | $Al_2O_3$ | 1 mm sphere | 0.85 | | 0.64 | | 0.002 | | 14 | | 362° C. | 50% |
| 3 | 6 | 4% Rh/4% Sm | $Al_2O_3$ | 1 mm sphere | 2.7 | | 2.6 | | 0.02 | | 30 | | 396° C. | 40% |
| 3 | 7 | 4% Rh/4% Sm | $Al_2O_3$ | 1 mm sphere | 2 | | 1.7 | | 0.01 | | 27 | | 375° C. | 40% |
| 3 | 8 | 4% Rh/4% Sm | $Al_2O_3$ | 1 mm sphere | 1.5 | | 1.3 | | 0.01 | | 26 | | 360 C. | 40% |
| 3 | 9 | 4% Rh/4% Sm | $Al_2O_3$ | 1 mm sphere | 1.3 | | 1.1 | | 0.006 | | 21 | | 355 C. | 20% |
| 4 | 10 | 4% Rh/4% Sm | $Al_2O_3$ | 1 mm sphere | 4.4 | 6.3 | 3.8 | 5.9 | 0.02 | 0.04 | 18 | 27 | 330 C. | No |

TABLE 1-continued

Surface Area and Volume Properties of Catalyst Supports and Catalysts*

| Example No. | Cat. No. | Catalytic Components | Support Material | Support Geometry | BET Surf. Area (m²/g) | | BJH Desorp. Surf. Area of pore 1.7–300 nm (m²/g) | | BJH Desorp. Pore V of pores 1.7–300 nm (cc/g) | | BJH Desorp. Avg. Pore Dia. (4V/A) (nm) | | Light-off Temp. (lab) | Propane Feed (lab) |
|---|---|---|---|---|---|---|---|---|---|---|---|---|---|---|
| | | | | | Sup. | Cat. | Sup. | Cat. | Sup. | Cat. | Sup. | Cat. | | |
| 5 | 11 | 4% Rh/4% Sm | Al₂O₃ | 35–50 mesh | 1 | 2 | 0.8 | 2 | 0.003 | 0.01 | 16.9 | 19 | 348° C. | 25% |
| 5 | 12 | 4% Rh/4% Sm | Al₂O₃ | 16–20 mesh | 0.9 | 1 | 0.6 | 1 | 0.002 | 0.006 | 16 | 23 | 450° C. | 25% |

*measured using $N_2$ as adsorptive.

In the present studies, it was observed that, in general, as the average pore surface area of the supported catalyst decreased, the greater the amount of propane needed to initiate the CPOX reaction/syngas production. More importantly, however, it was discovered that supported catalysts having all of the following physical properties demonstrated superior light-off performance and catalyst stability:

(a) BET surface area larger than 1 m²/g;
(b) pore volume larger than 0.003 cc/g;
(c) average pore size 10 nm to 150 nm in diameter, with at least 5% of the pores being less than 10 nm in diameter, and preferably greater than 0.5 nm in diameter; and
(d) metal dispersion greater than 1.0 m²/g catalyst.

The stated pore diameters and ranges were determined using the $N_2$ as the adsorptive as described below. The pore size range 10–150 nm corresponds to about 10 nm to 250 nm when measured using mercury intrusion porosimetry technique that is also described below. A catalyst support having a sufficiently mesoporous character (i.e., <10 nm diameter pores and preferably >0.5 nm) (as measured using the $N_2$ adsorptive technique), together with a suitable catalytic component, is highly preferred for optimal light-off of the CPOX syngas reaction, such that the catalytic reaction starts at a temperature of less than 500° C.

Although the above-described representative controlled pore catalysts comprise approximately 0.3–0.5 mm and 1 mm diameter spheres or particles, acceptable particle or spheres having the same light-off enhancing properties described above can range in size from 50 microns to 6 mm in diameter or about 270 mesh (0.1 mm), or even smaller, up to about ¼ inch. Preferably the particles are no more than 3 mm in their longest characteristic dimension, or range from about 0.5 to 3 mm. The term "mesh" refers to a standard sieve opening in a screen through which the material will pass, as described in the Tyler Standard Screen Scale (C. J. Geankoplis, TRANSPORT PROCESSES AND UNIT OPERATIONS, Allyn and Bacon, Inc., Boston, Mass., p. 837), hereby incorporated herein by reference. Preferably the support materials are pre-shaped as granules, spheres, pellets, or other geometry that provides satisfactory engineering performance (e.g., thermal stability and low pressure drop along the packed bed low pressure), before application of the catalytic materials.

Measurement of BET Surface Area and Pore Size Distribution Using $N_2$ as Adsorptive.

Surface area and pore size distribution are obtained on a Micromeritics TriStar 3000 analyzer after degassing the sample at 190° C. in flowing nitrogen for five hours. Surface area is determined from ten points in the nitrogen adsorption isotherm between 0.05 and 0.3 relative pressure and calculating the surface area by the standard BET procedure. Pore size distribution is determined from a minimum of 30 points in the nitrogen desorption isotherm and calculated using the BJH model for cylindrical pores. The instrument control and calculations are performed using the TriStar software and are consistent with ASTM D3663-99 "Surface Area of Catalysts and Catalyst Carriers", ASTM D4222-98 "Determination of Nitrogen Adosorption and Desorption Isotherms of Catalysts by Static Volumetric Measurements", and ASTM D4641-94 "Calculation of Pore Size Distributions of Catalysts from Nitrogen Desorption Isotherms". The initial surface area of the catalyst is the surface area of the catalyst structure prior to contact of reactant gas. The pore volume of the catalyst ($N_2$ as adsorptive) is measured and calculated using the method described above. Pore size (diameter) based on the same method is calculated as 4V/A.

Measurement of Metal Surface Area.

The metal surface area of the catalyst or support is determined by measuring the dissociation of $H_2$ on the surface of the metal. A Micromeritics ASAP 2010 automatic analyzer system is used, employing $H_2$ as a probe molecule. The ASAP 2010 system uses a flowing gas technique for sample preparation to ensure complete reduction of reducible oxides on the surface of the sample. A gas such as hydrogen flows through the heated sample bed, reducing the oxides on the sample (such as platinum oxide) to the active metal (pure platinum). Since only the active metal phase responds to the chemisorbate (hydrogen in the present case), it is possible to measure the active surface area and metal dispersion independently of the substrate or inactive components. The analyzer uses the static volumetric technique to attain precise dosing of the chemisorbate and rigorously equilibrates the sample. The first analysis measures both strong and weak sorption data in combination. A repeat analysis measures only the weak (reversible) uptake of the probe molecule by the sample supports and the active metal. As many as 1000 data points can be collected with each point being fully equilibrated.

Prior to the measurement of the metal surface area the sample is pre-treated. The first step is to pretreat the sample in He for 1 hr at 100° C. The sample is then heated to 350° C. in He for 1 hr. These steps clean the surface prior to measurement.

Next the sample is evacuated to sub-atmospheric pressure to remove all previously adsorbed or chemisorbed species.

The sample is then oxidized in a 10% oxygen/helium gas at 350° C. for 30 minutes to remove any possible organics that are on the surface.

The sample is then reduced at 500° C. for 3 hours in pure hydrogen gas. This reduces any reducible metal oxide to the active metal phase. The sample is then evacuated using a vacuum pump at 450° C. for 2 hours. The sample is then cooled to 35° C. prior to the measurement. The sample is then ready for measurement of the metal surface.

From the measurement of the volume of $H_2$ uptake during the measurement step, it is possible to determine the metal surface area per gram of catalyst structure by the following equation.

$$MSA = (V)(A)(S)(a)/22400/m \qquad (5)$$

where MSA is the metal surface area in $m^2$/gram of catalyst structure;
V is the volume of adsorbed gas at Standard Temperature and Pressure in ml.;
A is the Avogadro constant;
S is the stoichiometric factor (2 for $H_2$ chemisorption);
m is the sample weight in grams; and
a is the metal cross sectional area.

Measurement of Physical Properties by Mercury Intrusion Porosimetry

Mercury porosimetry characterizes a material's porosity by applying various levels of pressure to a sample immersed in mercury. The pressure required to intrude mercury into the sample's pores is inversely proportional to the size of the pores. The data in FIGS. 23A and 23B were provided by Norpro, Akron, Ohio. The data in Table 2 were measured by Micromeritics Instrument Corporation, Norcross, Ga.

EXAMPLE 6

Rh/Sm on $ZrO_2$ Granules

Rh/Sm catalyst was prepared on $ZrO_2$ granules of 35–50 mesh size (0.3 mm to 0.5 mm), obtained from Sud-Chemie, Louisville, Ky. $Sm(NO_3)_3 \cdot 6H_2O$ (Aldrich) was dissolved in sufficient water to form an aqueous solution. A quantity of the support granules were placed in a crucible situated on a warm (75° C.) hotplate. The Sm salt solution was gradually added to the granules, allowing the water to evaporate between saturations, by drying on the hotplate at about 75° C. for 2 hours with frequent mixing of the granules. The dried granules were then calcined in air (static or flowing) according to the following program: heat from room temperature (RT) to about 125° C. at a rate of about 3° C./min, dwell at that temperature for about 60 min; heat from about 125° C. to about 400–900° C., preferably about 500° C., at a rate of about 1–10° C./min, preferably about 5° C./min, dwell at that temperature for about 120–360 min, or more, preferably about 180 min.

An aqueous solution of $RhCl_3 \cdot xH_2O$ was added dropwise to saturate the Sm-coated granules, prepared as described in the above paragraph. The Rh salt solution was gradually added to the Sm-loaded granules, allowing the water to evaporate between saturations as before. The dried granules were then calcined in air, according to the program described above.

These final calcined Rh/Sm/$ZrO_2$ granules were then subjected to reducing conditions in flowing $H_2$ (or $H_2/N_2$ mixture) at a flow rate of about 0.1–1 NLPM, or more, preferably about 0.6 NLPM, while applying heat according to the following program: heat from room temperature (RT) to about 125° C. at a rate of temperature increase of 3° C./min, dwell for about 30 min at that temperature; heat from about 125° C. to about 300 to 900° C., preferably about 500° C., at a rate of increase of about 1 to 10° C./min, preferably about 3° C./min, dwell at that temperature for about 60–360 min, or more, preferably about 180 min. The concentrations of the Sm and Rh solutions, and the amounts loaded onto the selected amount of granules, were chosen so as to provide a final catalyst containing 5.8% Rh and 4.1% Sm on $ZrO_2$ granules (Catalyst No. 13), as shown in Table 3. Metal content is expressed as weight percent of the final catalyst metal content.

(b.) Alternatively, the following procedure was followed: $Sm(NO_3)_3 \cdot 5H_2O$ (Aldrich) was dissolved in sufficient water to form an aqueous solution. The $ZrO_2$ granules were immersed into the solution for wet impregnation, then allowed to dry on a hotplate. The impregnated granules were calcined in air according to the following schedule: 5° C./min ramp to 325° C., hold at 325° C. for 1 h, 5° C./min ramp to 700° C., hold at 700° C. for 2 h, cool down to room temperature. 0.5839 g $RhCl_3 \cdot xH_2O$ (Aldrich) was dissolved in sufficient water to form an aqueous solution. The calcined Sm-containing granules were immersed into the rhodium solution for wet impregnation, then allowed to dry on a hotplate. The Rh impregnated granules were then calcined in air according to the following schedule: 5° C./min ramp to 325° C., hold at 325° C. for 1 h, 5° C./min ramp to 700° C., hold at 700° C. for 2 h, cool down to room temperature. This material was then reduced at 500° C. for 3 h under a stream of 300 mL/min $H_2$ and 300 mL/min $N_2$ to provide a catalyst containing 6% Rh and 5% Sm supported on $ZrO_2$ granules (Catalyst No. 14).

(c.) A similar procedure was employed to yield another catalyst with a final loading of 4.52% Rh and 4.13% Sm (in the form of $Sm_2O_3$) supported on 35–50 mesh $ZrO_2$ granules (Catalyst No. 15).

As shown in Table 3, in which the metal in the equation MSA=(V)(A)(S)(a)/22400/m is rhodium, the samarium content helps to increase metal dispersion on the particulate support.

TABLE 3

| | Dispersion of Active Material on the Support | |
| --- | --- | --- |
| Catalyst Composition | 5.42% Rh/3.73% Sm on 35–50 mesh $ZrO_2$ | 4.98% Rh on 35–50 mesh $ZrO_2$ |
| Metal dispersion - rhodium | 15.1% | 3.6% |
| Metal Surface Area - Sample ($m^2$/g catalyst structure) | 3.3 $m^2$/g | 0.71 $m^2$/g |
| Metal Surface Area - Metal ($m^2$/g metal) | 66.5 $m^2$/g | 15.38 $m^2$/g |

Catalysts 13–15 were evaluated for catalytic performance according to "Test Procedure—13 mm Pilot Scale Reactor." The catalyst composition and test results are shown in Tables 4 and 5.

EXAMPLE 7

6.12% Rh/4.5% Sm on Alumina Granules

A catalyst containing 6.12% Rh loaded on 35–50 mesh alumina granules was prepared as described in Example 6b, except that alumina granules were substituted for the zirconia granules. A 1.2 mL sample was also evaluated in a pilot-scale syngas production reactor as described in "Test Procedure—13 mm Pilot Scale Reactor" above. (Catalyst 16)

EXAMPLE 8

Rh on $ZrO_2$ Granules

A catalyst containing 6% Rh loaded on 35–50 mesh $ZrO_2$ granules was prepared as described in Example 6b, except that Sm was omitted. A 0.4 mL sample was evaluated in a pilot-scale syngas production reactor according to "Test Procedure—13 mm Pilot Scale Reactor." (Catalyst 17). The composition and catalyst bed dimensions of Catalyst 17 is summarized in Table 4 and the results of the tests on those samples are shown in Table 5.

TABLE 4

Catalyst Composition

| Ex. | Catalyst No. | Dimensions (D x L, mm) | Support | Samarium (wt %) | Rh (wt %) |
|---|---|---|---|---|---|
| 6a | 13 | 35–50 mesh | $ZrO_2$ | 4.1% | 5.8% |
| 6b | 14 | 1.2 mL | | 5% | 6% |
| 6c | 15 | | | 4.13% | 4.52% |
| 7 | 16 | 35–50 mesh 1.2 mL | $Al_2O_3$ | 4.5% | 6.12% |
| 8 | 17 | 35–50 mesh .4 mL | $ZrO_2$ | — | 6% |

D = diameter;
L = length of catalyst bed employed as a promoter on one of the preferred controlled pore structure supports, the Rh is believed to be highly dispersed in the final catalyst, similar to or better than that demonstrated in Table 3 and also described in U.S. patent application Ser. No. 09/946,305 and PCT/US01/27450 for Rh/Sm on a granular zirconia support (i.e., metal surface area—sample of 3.3 $m^2/g$ catalyst structure and metal surface area of 66.5 $m^2/g$ metal). The high dispersion of the catalytic metal, in combination with a sufficiently microporous support structure, favors startup of the CPOX reaction by the controlled pore structure supported catalysts. It is highly preferred that at least 5% of the pores in the support material be <10 nm in diameter, and preferably larger than 0.5 nm. The remainder of the pores (i.e., up to 95%) are preferably in the 10–150 nm diameter range, to provide a catalyst structure with an average pore diameter in the range of 10–150 nm. Once the CPOX process is initiated, the mesoporous/macroporous nature of the support structure allows continuation of the CPOX reaction and favors the desired high velocity flow rate and low pressure drop.

Process of Producing Syngas

A feed stream comprising a light hydrocarbon feedstock and an $O_2$-containing gas is contacted with a controlled pore structure catalyst, as described above, that is active for catalyzing the conversion of methane or natural gas and molecular oxygen to primarily CO and $H_2$ by a net catalytic partial oxidation (CPOX) reaction. Preferably a very fast contact (i.e., milliseconds range)/fast quench (i.e., less than one second) reactor assembly is employed. Several schemes for carrying out catalytic partial oxidation (CPOX) of hydrocarbons in a short contact time reactor are well known and

TABLE 5

Performance Data for Supported Rh/Sm Catalysts

| | | Metals Content (%) | | | | | | | Selectivity | |
|---|---|---|---|---|---|---|---|---|---|---|
| Ex. | Cat. No. | Rh | Sm | $NG:O_2$ ratio | Pressure (psig) | GHSV ($h^{-1}$) | Temp. (° C.) | $CH_4$ Conv. | CO | $H_2$ |
| 6a | 13 | 5.8 | 4.1 | 1.70:1 | 45 | 2,118,000 | 1033 | 90.9 | 95.8 | 89.5 |
| 6b | 14 | 4.52 | 4.13 | 1.69:1 | 90 | 1,803,000 | 1050 | 89.1 | 94.8 | 88.9 |
| | | | | 1.82:1 | 90 | 1,612,000 | 944 | 95 | 95 | 95 |
| | | | | 1.82:1 | 125 | 2,253,000 | 984 | 95 | 96 | 92 |
| 7 | 16 | 6.12 | 4.5 | 1.90:1 | 90 | 2,203,958 | 951 | 91 | 96 | 90 |
| 8 | 17 | 6 | — | 2:1 | 5.5 | 1,162,050 | 728 | 80 | 96 | 80 |
| | | | | | | 1,162,050 | 771 | 85 | 98 | 85 |
| | | | | | | 584,250 | 711 | 88 | 98 | 88 |
| | | | | | | 814,950 | 729 | 86 | 98 | 85 |
| 1 | 1 | 4 | 4 | 1.75:1 | 45* | 680,000* | 906* | 91* | 96* | 94* |

In Catalyst 13 (Ex. 6), 1.4 grams of Rh/Sm/$ZrO_2$ granules was used for the test.
In Catalyst 17 (Ex. 8), 0.4 mL (i.e., bed length about ⅛ inch, bed diameter about ½ inch) was used for the tests.
Ln = lanthanide;
NG = natural gas]
* indicates performance data of catalyst 1 when tested in the 1.5 inch (38 mm) pilot scale reactor, as described above.

A comparison of the catalytic performance of Catalyst Nos. 13–17 to similarly loaded monolith supports is presented in co-pending U.S. patent application Ser. No. 09/946,305 and in PCT/US01/27450, which are hereby incorporated herein by reference. In those studies, the particulate catalysts, with highly dispersed catalytic metal, were generally superior in performance to comparable monoliths for production of syngas in a CPOX process.

Metal dispersion of the Controlled Pore Structure Catalysts. When Rh is used as the precious metal, and Sm is have been described in the literature. The light hydrocarbon feedstock may be any gaseous hydrocarbon having a low boiling point, such as methane, natural gas, associated gas, or other sources of $C_1$–$C_5$ hydrocarbons. The hydrocarbon feedstock may be a gas arising from naturally occurring reserves of methane which contain carbon dioxide. Preferably, the feed comprises at least 50% by volume methane, more preferably at least 75% by volume, and most preferably at least 80% by volume methane. The gaseous hydrocarbon feedstock is contacted with the catalyst as a mixture with an $O_2$-containing gas, preferably pure oxygen. The oxygen-containing gas may also comprise steam and/or $CO_2$ in addition to oxygen. Alternatively, the hydrocarbon feedstock is contacted with the catalyst as a mixture with a gas comprising steam and/or $CO_2$. For the purposes of this disclosure, the term "catalytic partial oxidation" or "net catalytic partial oxidation reaction" means that the CPOX reaction (Reaction (2)) predominates. However, other reactions such as steam reforming (see Reaction 1), dry reforming (Reaction (3)) and/or water-gas shift (Reaction (4)) may also occur to a lesser extent.

(3)

(4)

The relative amounts of the CO and $H_2$ in the reaction product mixture resulting from the net catalytic partial oxidation of the methane or natural gas and oxygen feed mixture are preferably about $2:1 H_2:CO$, like the stoichiometric amounts of $H_2$ and CO produced in the partial oxidation reaction of Reaction (2).

As the preheated feed gas mixture passes over the catalyst to the point at which they ignite, an autothermal net catalytic partial oxidation reaction ensues. As discussed above, because a defined-pore catalyst is used in the process, light-off of the reaction is preferably achieved at a relatively low temperature (e.g., 330° C. or less), without use of a supplemental ignition agent such as a readily oxidizable gas. Preferably, the reaction conditions are maintained to promote continuation of the autothermal net catalytic partial oxidation process. For the purposes of this disclosure, "autothermal" means that after catalyst ignition, no additional heat must be supplied to the catalyst in order for the production of synthesis gas to continue. Autothermal reaction conditions are promoted by optimizing the concentrations of hydrocarbon and $O_2$ in the reactant gas mixture preferably within the range of about a 1.5:1 to about 2.3:1 ratio of carbon:oxygen. The hydrocarbon:oxygen ratio is the most important variable for maintaining the autothermal reaction and the desired product selectivities. Pressure, residence time, amount of feed preheat and amount of nitrogen dilution, if used, also affect the reaction products. All of these variables are preferably adjusted as necessary such that the desired $H_2:CO$ ratio is achieved in the syngas emerging from the reactor. Preferably, the methane-containing feed and the oxygen-containing gas are mixed in such amounts to give a carbon (i.e., carbon in methane) to oxygen (i.e., molecular oxygen) ratio from about 1.5:1 to about 3.3:1, more preferably, from about 1.7:1 to about 2.1:1, and especially the stoichiometric ratio of 2:1. In some situations, such as when the methane-containing feed is a naturally occurring methane reserve, carbon dioxide may also be present in the methane-containing feed without detrimentally affecting the process. Depending on the particular situation, it may also be desirable at times to adjust the concentrations of the reactant gas mixture in order to increase or decrease the exothermicity of the process, maintain autothermal and enhance production of CO and $H_2$ at the desired ratio. The process is preferably operated at catalyst temperatures of from about 600° C. to about 2,000° C., preferably up to about 1,600° C. The hydrocarbon feedstock and the oxygen-containing gas are preferably pre-heated at a temperature between about 30° C. and 750° C., more preferably not exceeding 500° C., before contact with the catalyst to facilitate light-off of the reaction. As previously mentioned, it is highly preferred that use of a supplemental burst of propane or other readily oxidizable gas added to the hydrocarbon stream is avoided.

The process is operated at atmospheric or superatmospheric pressures, the latter being preferred. The pressures may be from about 100 kPa to about 32,000 kPa (about 1–320 atm), preferably from about 200 kPa to 10,000 kPa (about 2–100 atm). The hydrocarbon feedstock and the oxygen-containing gas may be passed over the catalyst at any of a variety of space velocities. Space velocities for the process, stated as gas hourly space velocity (GHSV), are from about 20,000 to about 100,000,000 $h^-$, preferably from about 100,000 to about 25,000,000 $h^{-1}$. Although for ease in comparison with prior art systems space velocities at standard conditions have been used to describe the present invention, it is well recognized in the art that residence time is the inverse of space velocity and that the disclosure of high space velocities equates to low residence times on the catalyst. Under these operating conditions a flow rate of reactant gases is maintained sufficient to ensure a residence time of no more than 200 milliseconds with respect to each portion of reactant gas in contact with the catalyst. Preferably the residence time is less than 50 milliseconds, and more preferably under 20 milliseconds. A contact time of 10 milliseconds or less is highly preferred. The product gas mixture emerging from the reactor is harvested and may be routed directly into any of a variety of applications.

One such application for the CO and $H_2$ product stream is for producing higher molecular weight hydrocarbon compounds using Fischer-Tropsch technology. It is an advantage of the present process that efficient syngas production at superatmospheric operating pressure facilitates the direct transition to a downstream process, such as a Fischer-Tropsch process, oftentimes without the need for intermediate compression. Alternatively, the syngas product can serve as a source of $H_2$ for fuel cells. Fuel cells are chemical power sources in which electrical power is generated in a chemical reaction. The most common fuel cell is based on the chemical reaction between a reducing agent such as hydrogen and an oxidizing agent such as oxygen. If providing feed for a fuel cell, a controlled-pore catalyst that provides enhanced selectivity for $H_2$ product may be chosen, and process variables adjusted such that a $H_2:CO$ ratio greater than 2:1 is obtained.

While the preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. The disclosures of all patents, patent applications and publications cited above are hereby incorporated herein by reference. The discussion of certain references in the Description of Related Art is not an admission that they are prior art to the present invention, especially any references that may have a publication date after the priority date of this patent application.

What is claimed is:

1. A method of enhancing light-off of a catalytic partial oxidation process for converting a light hydrocarbon and $O_2$ to synthesis gas, the method comprising:

contacting a reactant gas mixture containing said light hydrocarbon and $O_2$ with a particulate catalyst comprising a catalytic component and a porous support having an initial BET surface area larger than 1.0 $m^2$ per gram of support, a pore volume in the range of about 0.01–0.1 cc per gram of support, an avenge pore size in the range of 10 to 150 nm in diameter, with at least a portion of the pores being less than 10 nm in diameter, whereupon initiation of said catalytic partial oxidation reaction occurs at a temperature less than 500° C., such that a gaseous mixture comprising CO and H$_2$ is produced.

2. The method of claim 1 wherein no supplemental ignition agent is used to initiate light-off.

3. The method of claim 1 wherein at least 5% of said pores have diameters in the range of 0.5–10 nm diameter and the remainder of said pores are in the range of 10–150 nm diameter.

4. The method of claim 1 wherein said initiation occurs at a temperature of 300° C. or less.

5. The method of claim 1 wherein said initial support surface area is in the range of about 2 to 10 m$^2$/g catalyst support.

6. The method of claim 1 wherein said initial support average pore diameter is in the range of about 10 nm–150 nm.

7. The method of claim 1 wherein said catalytic component comprises an initial metal surface area greater than 1 m$^2$/g catalyst.

8. The method of claim 7 wherein the initial metal surface area of said catalytic component is at least 1.25 square meters per gram of catalyst.

9. The method of claim 1 wherein said catalytic component comprises at least one metal chosen from the group consisting of Rh, Pt, Ir, Ru, Ni, Pd, and combinations thereof.

10. The method of claim 1 wherein said catalytic component comprises a promoter chosen from the group consisting of Mg, Ca, Ba, Sr, Li, Na and K.

11. The method of claim 1 wherein said catalytic component comprises a metal alloy containing two or more metals chosen from the group consisting of Rh, Pt, Ir, Ru, Pd, Go, Fe, Ni, Cu and Zn.

12. The method of claim 11 wherein said metal alloy contains Co or Ni.

13. The method of claim 1 wherein said catalytic component comprises Rh and a lanthanide.

14. The method of claim 13 wherein said lanthanide comprises Sm and said catalytic component comprises an amount of Rh in the range of about 0.5–10 wt % and an amount of Sm in the range of about 0.5–10 wt % (wt % based on total weight of the supported catalyst).

15. The method of claim 1 wherein said porous support comprises a refractory material chosen from the group consisting of zirconia, magnesium stabilized zirconia, yttrium stabilized zirconia, calcium stabilized zirconia, alumina, zirconia stabilized alumina, magnesium modified alumina, cordierite, titania, silica, magnesia, niobia, ceria, vanadia, and silicon carbide.

16. The method of claim 1 wherein said particulate catalyst comprises particles, at least a majority of the particles having a maximum characteristic length up to six millimeters.

17. The method of claim 16 wherein at least a majority of the particles are generally spherical with a diameter of up to about five millimeters.

18. The method of claim 17 wherein the diameter of said particles is in the range of about 0.5–3 mm.

19. A method of partially oxidizing a reactant gas mixture comprising a light hydrocarbon to form synthesis gas, the method comprising:
passing a reactant gas mixture comprising said light hydrocarbon and oxygen over a catalyst bed comprising a plurality of catalyst particles, each said particle comprising a catalytic component and a porous support, said support having
an initial BET surface area larger than 1.0 m$^2$/g,
a pore volume in the range of larger than 0.003 to about 0.1 cc/g,
an average pore size in the range of 10–150 nm in diameter, with at least a portion of the pores being no more than 10 nm in diameter, and
said catalyst particles having a catalytic component initial metal surface area greater than 1.0 m$^2$/g catalyst particles,
such that a catalytic partial oxidation reaction ensues and a product stream containing CO and H$_2$ is produced.

20. The method of claim 19 where the catalytic partial oxidation reaction is initiated at a temperature less than 500° C. in the absence of a supplemental ignition agent.

21. The method of claim 19 further comprising passing said reactant gas mixture over said catalyst at a gas hourly space velocity of at least 20,000 h$^-$.

22. The method of claim 19 further comprising passing said reactant gas mixture over said catalyst at a gas hourly space velocity up to 100,000,000 h$^-$.

23. The method of claim 19 further comprising maintaining said reactant gas mixture at a pressure in excess of 100 kPa (about 1 atmosphere) while contacting said catalyst.

24. The method of claim 23 wherein said pressure is up to about 32,000 kPa (about 320 atmospheres).

25. The method of claim 24 wherein said pressure is in the range of 200–10,000 kPa (about 2–100 atmospheres).

26. The method of claim 19 further comprising preheating said reactant gas mixture to a temperature in the range of about 300° C.–750°C. before contacting said catalyst.

27. The method of claim 19 wherein said reactant gas mixture comprises a mixture of methane or natural gas and an O$_2$-containing gas at a carbon:oxygen molar ratio in the range of about 1.5:1 to about 3.3:1.

28. The method of claim 27 further comprising mixing a methane-containing feedstock and said O$_2$-containing gas at a carbon:oxygen molar ratio in the range of about 2:1.

29. The method of claim 19 wherein said light hydrocarbon comprises at least about 80% methane by volume.

30. The method of claim 19 further comprising maintaining catalytic partial oxidation reaction promoting conditions comprising:
regulating the relative amounts of hydrocarbon and O$_2$ in said reactant gas mixture,
regulating the preheating of said reactant gas mixture,
regulating the operating pressure of said reactor,
regulating the space velocity of said reactant gas mixture, and
regulating the hydrocarbon composition of said hydrocarbon containing gas.

31. The method of claim 19 wherein said catalytic component comprises Rh and Sm and said porous support comprises alumina or modified alumina, said support having:
at least 5% of said pores in the range of 0.5–10 nm diameter,
a BET surface area in the range of about 4–10 m$^2$/g,
a BJH desorption surface area (surface area of 1.7–300 nm diameter pores) in the range of about 4–10 m$^2$/g,
a BJH desorption pore volume (of pores having diameters in the range of 1.7–300 nm) in the range of about 0.01–0.1 cc/g, and
a BJH desorption average pore diameter (4V/A) in the range of about 10–100 nm.

32. The method of claim 19 wherein said catalyst particles comprise
- a BET surface area in the range of about 4–10 $m^2/g$,
- a BJH desorption surface area (surface area of 1.7–300 nm diameter pores) in the range of about 4–10 $m^2/g$,
- a BJH desorption pore volume (of pores having diameters in the range of 1.7–300 nm) in the range of about 0.01–0.1 cc/g, and
- a BJH desorption average pore diameter (4V/A) in the range of about 10–100 nm.

33. The method of claim 1 wherein said catalytic component comprises Rh and Sm, and wherein said porous support comprises alumina or modified alumina and further has:
- at least 5% of said pores in the range of 0.5–10 mm diameter,
- a BET surface area in the range of about 4–10 $m^2/g$,
- a BJH desorption surface area (surface area of 1.7–300 nm diameter pores) in the range of about 4–10 $m^2/g$,
- a BJH desorption pore volume (of pores having diameters in the range of 1.7–300 nm) in the range of about 0.01–0.1 cc/g, and
- a BJH desorption average pore diameter (4V/A) in the range of about 10–100 nm.

34. The method of claim 19 where the pore volume is in the range of 0.01–0.1 cc per gram of support.

35. A method of enhancing light-off of a catalytic partial oxidation process for converting a light hydrocarbon and $O_2$ to synthesis gas, the method comprising:
- contacting a reactant gas mixture containing said light hydrocarbon and $O_2$ with a particulate catalyst comprising a catalytic component and a porous support having an initial BET surface area larger than 1.0 $m^2$ per gram of support, a pore volume in the range of larger than 0.003 to about 0.1 cc per gram of support, an avenge pore size in the range of 10 to 150 nm in diameter, with at least a portion of the pores being less than 10 nm in diameter, whereupon initiation of said catalytic partial oxidation reaction occurs at a temperature less than 500° C., such that a gaseous mixture comprising CO and $H_2$ is produced.

36. The method of claim 35 wherein no supplemental ignition agent is used to initiate light-off.

37. The method of claim 35 wherein at least 5% of said pores have diameters in the range of 0.5–10 nm diameter and the remainder of said pores are in the range of 10–150 nm diameter.

38. The method of claim 35 wherein said initiation occurs at a temperature of 300° C. or less.

39. The method of claim 35 wherein said initial support surface area is in the range of about 2 to 10 $m^2/g$ catalyst support.

40. The method of claim 35 wherein said catalytic component comprises an initial metal surface area greater than 1 $m^2/g$ catalyst.

41. The method of claim 35 wherein said catalytic component comprises at least one metal chosen from the group consisting of Rh, Pt, Ir, Ru, Ni, Pd, and combinations thereof.

42. The method of claim 35 wherein said catalytic component comprises a promoter chosen from the group consisting of Mg, Ga, Ba, Sr, Li, Na and K.

43. The method of claim 35 wherein said catalytic component comprises a metal alloy containing two or more metals chosen from the group consisting of Rb, Pt, Ir, Ru, Pd, Co, Fe, Ni, Cu and Zn.

44. The method of claim 35 wherein said catalytic component comprises Rh and a lanthanide.

45. The method of claim 44 wherein said catalytic component comprises an amount of Rh in the range of about 0.5–10 wt % (wt % based on total weight of the supported catalyst).

46. The method of claim 44 wherein said lanthanide comprises Sm.

47. The method of claim 35 further comprising maintaining said reactant gas mixture at a pressure in the range of 200–10,000 kPa (about 2–100 atmospheres) while contacting said particulate catalyst.

* * * * *

UNITED STATES PATENT AND TRADEMARK OFFICE
CERTIFICATE OF CORRECTION

PATENT NO.       : 7,056,488 B2
APPLICATION NO.  : 10/299879
DATED            : June 6, 2006
INVENTOR(S)      : Tianyan Niu et al.

Page 1 of 1

It is certified that error appears in the above-identified patent and that said Letters Patent is hereby corrected as shown below:

Column 23,
Line 37, "Go" should read --Co--.

Column 24,
Line 19, "20,000 h" should read --20,000 $h^{-1}$--.

Column 24,
Line 19, "100,000,000 h" should read --100,000,000 $h^{-1}$--.

Column 24,
Line, 32, "300°C" should read --30°C--.

Column 26,
Line 22, "Ga" should read --Ca--.

Signed and Sealed this

Fifteenth Day of August, 2006

JON W. DUDAS
*Director of the United States Patent and Trademark Office*